United States Patent
Phan

(10) Patent No.: US 12,449,413 B2
(45) Date of Patent: Oct. 21, 2025

(54) METHOD OF ASSESSING WOUND HEALING POTENCY OF A MESENCHYMAL STEM POPULATION AND RELATED METHODS OF SELECTING MESENCHYMAL STEM CELLS AND IDENTIFYING TISSUE AS STARTING MATERIAL FOR PRODUCING A MESENCHYMAL STEM CELL POPULATION

(71) Applicant: CELLRESEARCH CORPORATION PTE. LTD., Singapore (SG)

(72) Inventor: Toan Thang Phan, Singapore (SG)

(73) Assignee: CELLRESEARCH CORPORATION PTE. LTD., Singapore (SG)

( * ) Notice: Subject to any disclaimer, the term of this patent is extended or adjusted under 35 U.S.C. 154(b) by 331 days.

(21) Appl. No.: 17/066,378

(22) Filed: Oct. 8, 2020

(65) Prior Publication Data

US 2021/0140942 A1    May 13, 2021

Related U.S. Application Data

(60) Provisional application No. 62/912,374, filed on Oct. 8, 2019.

(51) Int. Cl.
*G01N 33/50*     (2006.01)
*C12N 5/00*      (2006.01)
*G01N 33/68*     (2006.01)

(52) U.S. Cl.
CPC ....... *G01N 33/5005* (2013.01); *C12N 5/0018* (2013.01); *G01N 33/6803* (2013.01); *G01N 2333/475* (2013.01); *G01N 2333/4753* (2013.01); *G01N 2333/495* (2013.01); *G01N 2496/00* (2013.01)

(58) Field of Classification Search
CPC .......... G01N 33/5005; G01N 33/6803; G01N 2333/475; G01N 2333/4753; G01N 2333/495; G01N 2496/00; G01N 33/5073; G01N 2333/515; C12N 5/0018; A61K 35/28; A61P 17/02
See application file for complete search history.

(56) References Cited

U.S. PATENT DOCUMENTS

| | | | |
|---|---|---|---|
| 5,919,702 | A | 7/1999 | Purchio et al. |
| 9,085,755 | B2 | 7/2015 | Phan et al. |
| 9,737,568 | B2 | 8/2017 | Phan et al. |
| 9,844,571 | B2 | 12/2017 | Phan et al. |
| 10,988,736 | B2 * | 4/2021 | Phan .................... C12N 5/0668 |
| 2004/0136967 | A1 | 7/2004 | Weiss et al. |
| 2006/0078993 | A1 | 4/2006 | Phan et al. |
| 2018/0127721 | A1 * | 5/2018 | Phan ...................... A61K 35/50 |
| 2019/0117701 | A1 | 4/2019 | Ikeyama et al. |

FOREIGN PATENT DOCUMENTS

| | | |
|---|---|---|
| AU | 2017224148 | 2/2017 |
| EP | 2597149 A1 | 5/2013 |
| EP | 3450548 A1 | 3/2019 |
| JP | 2008-509699 A | 4/2008 |
| RU | 2621867 C1 | 6/2017 |
| WO | 2006019357 A1 | 2/2006 |
| WO | 2007046775 A1 | 4/2007 |
| WO | 2017188403 A1 | 11/2017 |
| WO | 2018067071 A1 | 4/2018 |
| WO | 2019199234 A1 | 10/2019 |

OTHER PUBLICATIONS

Tomas de Mayo et al. The role of bone marrow mesenchymal stromal cell derivatives in skin wound healing in diabetic mice; PLoS One 12(6): e0177533 (Year: 2017).*
Mingjun Wu et al., Comparison of the Biological Characteristics of Mesenchymal Stem Cells Derived from the Human Placenta and Umbilical Cord, Scientific Reports; 8:5014, DOI:10.1038/s41598-018-23396-1 (Year: 2018).*
Lee, D.E., Ayoub, N. & Agrawal, D.K. Mesenchymal stem cells and cutaneous wound healing: novel methods to increase cell delivery and therapeutic efficacy. Stem Cell Res Ther 7, 37 (2016). (Year: 2016).*
Guo et al.; Factors Affecting Wound Healing; J Dent Res. Mar. 2010; 89(3): 219-229 (Year: 2010).*
Bao et al., The Role of Vascular Endothelial Growth Factor in Wound Healing. J Surg Res. May 15, 2009;153(2):347-358.
Beeravolu et al., Isolation and Characterization of Mesenchymal Stromal Cells from Human Umbilical Cord and Fetal Placenta. J Vis Exp. Apr. 3, 2017;(122):55224.
Bitto et al., Angiopoietin-1 gene transfer improves the impaired wound healing of the genetically diabetic mice without increasing VEGF expression. Clin Sci (Lond). Jun. 2008;114(12):707-718.
Conway et al, Hepatocyte growth factor regulation: An integral part of why wounds become chronic. Wound Repair Regen. Sep.-Oct. 2007;15(5):683-692.
Covas et al., Isolation and culture of umbilical vein mesenchymal stem cells. Braz J Med Biol Res. Sep. 2003;36(9):1179-1183.

(Continued)

*Primary Examiner* — Fereydoun G Sajjadi
*Assistant Examiner* — Masudur Rahman
(74) *Attorney, Agent, or Firm* — Michael A. Whittaker

(57) ABSTRACT

The present invention relates to a method of assessing the wound healing potency of a mesenchymal stem cell population. In addition, the present invention concerns a method of selecting a mesenchymal stem cell population for producing a stem cell population under cGMP conditions and a method of selecting a mesenchymal stem cell population for producing a stem cell population for subsequent pharmaceutical administration. Further, the present invention relates to a method of selecting a mesenchymal stem cell population for generating a master cell bank and to a method of identifying a tissue suitable as starting material for producing a mesenchymal stem cell population for pharmaceutical use.

13 Claims, 7 Drawing Sheets

Specification includes a Sequence Listing.

(56) References Cited

OTHER PUBLICATIONS

Dominici et al., Minimal criteria for defining multipotent mesenchymal stromal cells. The International Society for Cellular Therapy position statement. Cytotherapy. 2006;8(4):315-317.
Froget et al., Wound healing mediator production by human dermal fibroblasts grown within a collagen-GAG matrix for skin repair in humans. Eur Cytokine Netw. Jan.-Mar. 2003;14(1):60-64.
Kundrotas, Surface markers distinguishing mesenchymal stem cells from fibroblasts. Acta Medica Lituanica. 2012;19(2):75-79.
Li et al., Mesenchymal stem cells modified with angiopoietin-1 gene promote wound healing. Stem Cell Res Ther. Sep. 16, 2013;4(5):113 (10 pages).
Li et al., HGF Accelerates Wound Healing by Promoting the Dedifferentiation of Epidermal Cells through β 1-Integrin/ILK Pathway. Biomed Res Int. 2013;2013:470418.
Mitchell et al., Matrix Cells from Wharton's Jelly Form Neurons and Glia. Stem Cells. 2003;21(1):50-60.
Pakyari et al., Critical Role of Transforming Growth Factor Beta in Different Phases of Wound Healing. Adv Wound Care (New Rochelle). Jun. 2013;2(5):215-224.
Paladino et al., Intrinsic Variability Present in Wharton's Jelly Mesenchymal Stem Cells and T Cell Responses May Impact Cell Therapy. Stem Cells Int. 2017;2017:8492797.
Paladino et al., Comparison between isolation protocols highlights intrinsic variability of human umbilical cord mesenchymal cells. Cell Tissue Bank. Mar. 2016;17(1):123-136.
Ramirez et al., The Role of TGFβ Signaling in Wound Epithelialization. Adv Wound Care (New Rochelle). Jul. 1, 2014;3(7):482-491.
Romanov et al., Searching for Alternative Sources of Postnatal Human Mesenchymal Stem Cells: Candidate MSC-Like Cells from Umbilical Cord. Stem Cells. 2003;21(1):105-110.
Schugar et al., High Harvest Yield, High Expansion, and Phenotype Stability of CD146 Mesenchymal Stromal Cells from Whole Primitive Human Umbilical Cord Tissue. J Biomed Biotechnol. 2009;2009:789526.
Sensebe et al., Production of mesenchymal stromal/stem cells according to good manufacturing practices: a review. Stem Cell Res Ther. Jun. 7, 2013;4(3):66 (6 pages).
Subramanian et al., Comparative Characterization of Cells from the Various Compartments of the Human Umbilical Cord Shows that the Wharton's Jelly Compartment Provides the Best Source of Clinically Utilizable Mesenchymal Stem Cells. PLoS One. Jun. 10, 20150;10(6):e0127992.
Van Pham et al., Isolation and proliferation of umbilical cord tissue derived mesenchymal stem cells for clinical applications. Cell Tissue Bank. Jun. 2016;17(2):289-302.

Vonk et al., Autologous, allogeneic, induced pluripotent stem cell or a combination stem cell therapy? Where are we headed in cartilage repair and why: a concise review. Stem Cell Res Ther. May 15, 2015;6:94.
Yoshida et al., Neutralization of Hepatocyte Growth Factor Leads to Retarded Cutaneous Wound Healing Associated with Decreased Neovascularization and Granulation Tissue Formation. J Invest Dermatol. Feb. 2003;120(2):335-343.
International Search Report and Written Opinion issued in PCT/SG2020/050571 dated Dec. 28, 2020.
Amable et al., Protein synthesis and secretion in human mesenchymal cells derived from bone marrow, adipose tissue and Wharton's jelly. Stem Cell Res Ther. Apr. 16, 2014;5(2):53 (13 pages).
Li et al., Human Amniotic Mesenchymal Stem Cells and Their Paracrine Factors Promote Wound Healing by Inhibiting Heat Stress-induced Skin Cell Apoptosis and Enhancing their Proliferation through Activating PI3K/AKT signaling pathway. Stem Cell Res Ther. Aug. 9, 2019;10(1):247 (17 pages).
Park et al., Strategies to enhance paracrine potency of transplanted mesenchymal stem cells in intractable neonatal disorders. Pediatr Res. Jan. 2018;83(1-2):214-222.
Shen et al., Conditioned medium from umbilical cord mesenchymal stem cells induces migration and angiogenesis. Mol Med Rep. Jul. 2015;12(1):20-30.
Wu et al., Comparison of the Biological Characteristics of Mesenchymal Stem Cells Derived from the Human Placenta and Umbilical Cord. Sci Rep. Mar. 22, 2018;8(1):5014 (9 pages).
Lim and Phan, Epithelial and Mesenchymal Stem Cells from the Umbilical Cord Lining Membrane. Cell Transplant. 2014;23(4-5):497-503.
Shojaei et al., A review on different methods to increase the efficiency of mesenchymal stem cell-based wound therapy. Wound Repair Regen. Nov. 2019;27(6):661-671.
Extended European Search Report issued in EP 20875318 dated Oct. 6, 2023 (14 pages).
Ohara et al., Extracellular Vesicles from Amnion-Derived Mesenchymal Stem Cells Ameliorate Hepatic Inflammation and Fibrosis in Rats. Stem Cells Int. Dec. 24, 2018:2018:3212643 (16 pages).
Tamari et al., Acceleration of wound healing with stem cell-derived growth factors. Int J Oral Maxillofac Implants. Nov.-Dec. 2013;28(6):e369-375, abstract only.
Office Action issued in Russian Federation Application No. 2022111106/10 dated Feb. 29, 2024—incl Engl lang transl (13 pages total).
Yamahara et al., Comparison of Angiogenic, Cytoprotective, and Immunosuppressive Properties of Human Amnion- and Chorion-Derived Mesenchymal Stem Cells. PLoS One. Feb. 14, 2014;9(2):e88319.
Office Action issued in corresponding Japanese application No. 2022-521087 dated Jun. 13, 2024—incl Engl lang transl (10 pages total).

\* cited by examiner

METHOD OF ASSESSING WOUND HEALING POTENCY OF A MESENCHYMAL STEM POPULATION AND RELATED METHODS OF SELECTING MESENCHYMAL STEM CELLS AND IDENTIFYING TISSUE AS STARTING MATERIAL FOR PRODUCING A MESENCHYMAL STEM CELL POPULATION

CROSS-REFERENCE TO RELATED APPLICATIONS

The present application claims the benefit of priority of U.S. Provisional Application No. 62/912,374 filed Oct. 8, 2019, the contents of which are hereby incorporated by reference it its entirety for all purposes.

SEQUENCE LISTING

The instant application contains a Sequence Listing which has been submitted in ASCII format via EFS-Web and is hereby incorporated by reference in its entirety. Said ASCII copy, created on Oct. 8, 2020, is named SCH-5600-UT_SeqListing.txt and is 46 kilobytes in size.

FIELD OF THE INVENTION

The present invention relates to a method of assessing the wound healing potency of a mesenchymal stem cell population. In addition, the present invention concerns a method of selecting a mesenchymal stem cell population for producing a stem cell population under cGMP conditions and a method of selecting a mesenchymal stem cell population for producing a stem cell population for subsequent pharmaceutical administration. Further, the present invention relates to a method of selecting a mesenchymal stem cell population for generating a master cell bank and to a method of identifying a tissue suitable as starting material for producing a mesenchymal stem cell population for pharmaceutical use. The present invention also concerns use of at least one protein for assessing the wound healing potency of a mesenchymal stem cell population. The present invention also relates to use of at least one protein for selecting a mesenchymal stem cell population for producing a stem cell population under cGMP conditions. Furthermore, the present invention relates to use of at least one protein for selecting a mesenchymal stem cell population for selecting a mesenchymal stem cell population for producing a stem cell population for subsequent pharmaceutical administration. The present invention also relates to use of at least one protein for selecting a mesenchymal stem cell population for selecting a mesenchymal stem cell population for generating a master cell bank and to a use of at least one protein for selecting a mesenchymal stem cell population for selecting a mesenchymal stem cell population for identifying a tissue suitable as starting material for producing a mesenchymal stem cell population for pharmaceutical use. Moreover, the present invention concerns a method of identifying a medium suitable for inducing or improving wound healing properties of a mesenchymal stem cell population.

BACKGROUND OF THE INVENTION

Mesenchymal stem cells (MSCs) are capable of self-renewal and multilineage differentiation. Thereby, these cells are an attractive and promising tool for regenerative medicine. MSCs can be isolated from various tissues such as bone marrow stroma, fat tissue, dermis, placenta, umbilical cord blood or the different umbilical cord tissues comprising the Wharton's jelly, subendothelial layer of the umbilical cord vein, or the amniotic tissue of the umbilical cord (Mitchell, K. E. et al. (2003) *Stem Cells* 21, 50-60; U.S. Pat. No. 5,919,702; US Patent Application 2004/0136967; Romanov, Y. A. et al. (2003) *Stem Cells* 21, 105-110; Covas, D. T. et al. (2003) *Braz. J. Med. Biol. Res.* 36, 1179-1183; US2006/0078993). Mesenchymal stem cells isolated from the amniotic membrane of the umbilical cord have been first reported in US patent application 2006/0078993 (leading to granted U.S. Pat. Nos. 9,085,755, 9,737,568 and 9,844,571) and the corresponding International patent application WO2006/019357. In addition, a population of such mesenchymal stem cells from the amniotic membrane of the umbilical cord has recently been described in US application 20181/27721 or the corresponding International Application WO 2018/067071.

The mesenchymal stem cell population described in the US application 20181/27721 or the corresponding International Application WO 2018/067071 has the advantage that 99% or more of the stem cells of this population express the three MSC markers CD73, CD90 while lacking expression of CD34, CD45 and HLA-DR. This extremely homogenous and well defined cell population is thus an ideal candidate for clinical trials and cell based therapies as it, for example, fully meets the criteria generally accepted for human MSCs to be used for cellular therapy as defined, for example, by Dominici et al, "Minimal criteria for defining multipotent mesenchymal stromal cells. The International Society for Cellular Therapy position statement", Cytotherapy (2006) Vol. 8, No. 4, 315-317, Sensebe et al., "Production of mesenchymal stromal/stem cells according to good manufacturing practices: a, review", Stem Cell Research & Therapy 2013, 4:66), Vonk et al., Stem Cell Research & Therapy (2015) 6:94, or Kundrotas Acta Medica Lituanica. 2012. Vol. 19. No. 2. P. 75-79. As described in International Application WO 2018/067071, this mesenchymal stem cell population may, for example, be used in its undifferentiated state for wound healing purposes such as treatment of burns or chronic diabetic wounds. Alternatively, this mesenchymal stem cell population may be differentiated, for example, into insulin producing β-islet cells which can then be administered, for example by implantation, to a patient that suffers from an insulin deficiency such as diabetes mellitus (cf. also International Application WO2007/046775 in this respect).

The process of producing this mesenchymal stem cell population as also described in International Application WO 2018/067071 is suitable for being carried out under Good Manufacturing Practice (GMP) conditions, as required for such allogenic cell-based therapies. However, GMP production requires quality control of the manufactured drug product, regardless of whether the drug product is a small organic molecule, a biological molecule or even a cell population as in the case of the mesenchymal stem cell population of International Application WO 2018/067071. Thus, it would desirable to have at hand a quality control assay for the GMP production of the mesenchymal stem cell population of International Application WO 2018/067071.

In this context, it is known that mesenchymal stem cells, like any other biological material, have an intrinsic variability. For example, studies in cell biology of mesenchymal stem cells have identified a variety of factors that impact their longevity and expansion capacity. Issues such as source of donor tissue, donor age, environmental background, and isolation methods have been described to impact upon the overall quality of mesenchymal stem cells (see Paladino, et al. "Comparison between isolation protocols highlights intrinsic variability of human umbilical cord mesenchymal cells," Cell and Tissue Banking, vol. 17, no. 1, pp. 123-136, (2016), https://doi.org/10.1007/s10561-015-9525-6). In addition, Paladino, et al. supra, 2016 addressed individual variability in mesenchymal stem cells by comparing three different isolation methods of MSC from umbilical cord for purposes of cell banking, and to identify if there were advantages in terms of cell viability, longevity in culture, expansion potential and differentiation capacities. The authors report that since the same samples were treated with at least two of the three studied protocols and under highly controlled experimental conditions, their results reveal that part of the observed variability is clearly intrinsic to each donor with readout in doubling time and longevity. In a further study, Paladino et al. (2017) "Intrinsic Variability Present in Wharton's Jelly Mesenchymal Stem Cells and T Cell Responses May Impact Cell Therapy". Hindawi, Stem Cells International Volume 2017, Article ID 8492797, 12 pages, doi.org/10.1155/2017/8492797 showed that the gene expression of immunomodulatory molecules varied among samples of Wharton's Jelly mesenchymal stem cells (WJ-MSC) with no specific pattern present. In coculture, all WJ-MSCs were capable of inhibiting mitogen-activated CD3+ T cell proliferation, although to different degrees, and each PBMC responded with a different level of inhibition. The authors suggested that each WJ-MSC displays unique behavior, differing in patterns of cytokine mRNA expression and immunomodulatory capacity. The authors also assumed that variability between samples may play a role in the effectiveness of WJ-MSC employed therapeutically.

In light of these results, it is likely that MSC from the amniotic membrane of the umbilical cord also have an intrinsic variability with respect to the production of specific molecules which in turn may affect their suitability for therapeutic applications such as wound healing or diabetes. Thus, it would be of advantage to have at hand, a method for identifying a MSC population or MSC containing donor tissue that is suitable to be used for wound healing purposes, for example. Such a method would ideally be useful also for generating a master cell bank (which is necessary to produce a cellular therapy drug product) or for producing a stem cell population under cGMP conditions for subsequent pharmaceutical administration.

Accordingly, it is an object of the invention to provide a method that can, for instance be used, for identifying a donor for a MSC containing tissue or subsequently for a MSC population that is suitable to therapeutic applications such as wound healing.

SUMMARY OF THE INVENTION

This object is accomplished by the methods and uses having the features of the independent claims.

In a first aspect, the invention provides a method of assessing the wound healing potency of a mesenchymal stem cell population, wherein the method comprises determining in a medium the level of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) secreted into the medium by the mesenchymal stem cell population.

In a second aspect, the invention provides a method of selecting a mesenchymal stem cell population for producing a stem cell population under cGMP conditions, wherein the method comprises determining in a medium the level of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) secreted into the a medium by the mesenchymal stem cell population.

In a third aspect, the invention provides a method of selecting a mesenchymal stem cell population for producing a stem cell population for subsequent pharmaceutical administration, wherein the method comprises determining in a medium the level of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) secreted into the medium by the mesenchymal stem cell population.

In a fourth aspect, the invention provides a method of selecting a mesenchymal stem cell population for generating a master cell bank, wherein the method comprises determining in a medium the level of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) secreted into the medium by the mesenchymal stem cell population.

In a fifth aspect, the invention provides a method of identifying a tissue suitable as starting material for producing a mesenchymal stem cell population for pharmaceutical use, wherein the method comprises determining the level of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) secreted into a medium by a sample of the tissue or a cell isolated from the tissue.

In aسixth aspect, the invention provides the use of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) protein for assessing the wound healing potency of a mesenchymal stem cell population.

In a seventh aspect, the invention provides the use of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) protein for selecting a mesenchymal stem cell population for producing a stem cell population under cGMP conditions.

In an eighth aspect, the invention provides the use of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) protein for selecting a mesenchymal stem cell population for producing a stem cell population for subsequent pharmaceutical administration.

In a ninth aspect, the invention provides the use of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) protein for selecting a mesenchymal stem cell population for generating a master cell bank.

In a tenth aspect, the invention provides the use of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) protein for identifying a tissue suitable as starting material for producing a mesenchymal stem cell population for pharmaceutical use.

In an eleventh aspect, the invention provides a method of identifying a medium suitable for inducing or improving wound healing properties of a mesenchymal stem cell population, wherein the method comprises determining in a medium the level of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) secreted into the medium by the mesenchymal stem cell population.

In a twelfth aspect, the invention provides the use of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) protein for identifying a medium suitable for inducing or improving wound healing properties of a mesenchymal stem cell population.

BRIEF DESCRIPTION OF THE DRAWINGS

The invention will be better understood with reference to the detailed description when considered in conjunction with the non-limiting examples and the drawings, in which:

FIG. 2A shows the secretion level of Transforming Growth Factor beta (TGF-β) for the individual MSC populations 8049356, 8049358, 8049359, 8049364, 8049365, 8049369, 8049370, 8049372, 8049373 and 8049384. The secretion level of all 10 populations exceed the threshold value for TGF-β, which is about 500 pg/ml and indicated by the red line. FIG. 2B shows the secretion level of Hepatocyte Growth Factor (HGF) for the individual MSC populations 8049356, 8049358, 8049359, 8049364, 8049365, 8049369, 8049370, 8049372, 8049373 and 8049384. The secretion level of 8049365, 8049369, 8049372, 8049373 and 8049384 exceed the threshold value for HGF, which is about 100 pg/ml and indicated by the red line. FIG. 2C shows the secretion level of Angiopoietin 1 (Ang-1) for the individual MSC populations 8049356, 8049358, 8049359, 8049364, 8049365, 8049369, 8049370, 8049372, 8049373 and 8049384. The secretion level of all 10 populations exceed the threshold value for Ang-1, which is about 500 pg/ml and indicated by the red line. FIG. 2D shows the secretion level of Vascular Endothelial Growth Factor (VEGF) for the individual MSC populations 8049356, 8049358, 8049359, 8049364, 8049365, 8049369, 8049370, 8049372, 8049373 and 8049384. Except for 8049358, 8049359 and 8049370, the secretion level of all populations exceed the threshold value for VEGF, which is about 100 pg/ml and indicated by the red line.

FIG. 3A shows the secretion level of TGF-β in two separate samples indicating a stable protein secretion of about 2230 pg/ml and 2419 pg/ml post-stage 4, respectively. FIG. 3B shows the secretion level of HGF in two separate samples indicating a stable protein secretion of about 933 pg/ml and 985 pg/ml post-stage 4, respectively. FIG. 3C shows the secretion level of Ang-1 in two separate samples indicating a stable protein secretion of about 1800 pg/ml and 1854 pg/ml post-stage 4, respectively. FIG. 3D shows the secretion level of VEGF in two separate samples indicating a stable protein secretion of about 210 pg/ml and 219 pg/ml post-stage 4, respectively.

FIG. 4A summarizes the measurement of Ang-1. S1 denotes the highest standard used in the assay. Any samples that fall above are considered extrapolated (too concentrated). The graph depicts that all of CL-MSC, WJ-MSC and placental MSC produce much higher levels of Ang-1 when grown in PTT6 compared to when the MSC's were grown in PTT4 or DMEM/F12. FIG. 4B summarizes the measurement of VEGF in the analyzed supernatants of CL-MSC, WJ-MSC and placental MSC cultured in PTT6, PTT4 or DMEM/F12. S1 denotes the highest standard used in the assay. Any samples that fall above are considered extrapolated (too concentrated). As can be seen from the graph, all of CL-MSC, WJ-MSC and placental MSC produce much higher levels of VEGF when grown in PTT6 compared to when the MSC's were grown in PTT4 or DMEM/F12. FIG. 4C summarizes the measurement of HGF. The graph depicts that all of CL-MSC, WJ-MSC and placental MSC produce much higher levels of Ang-1 when grown in PTT6 compared to when the MSCs were grown in PTT4 or DMEM/F12. FIG. 4D shows the singleplex measurement of TGF-β1. As can be seen from the graph, all of CL-MSC, WJ-MSC and placental MSC produce more TGF-β1 when grown in PTT6 than when grown in DMEM/F12.

DETAILED DESCRIPTION OF THE INVENTION

Figure 1:
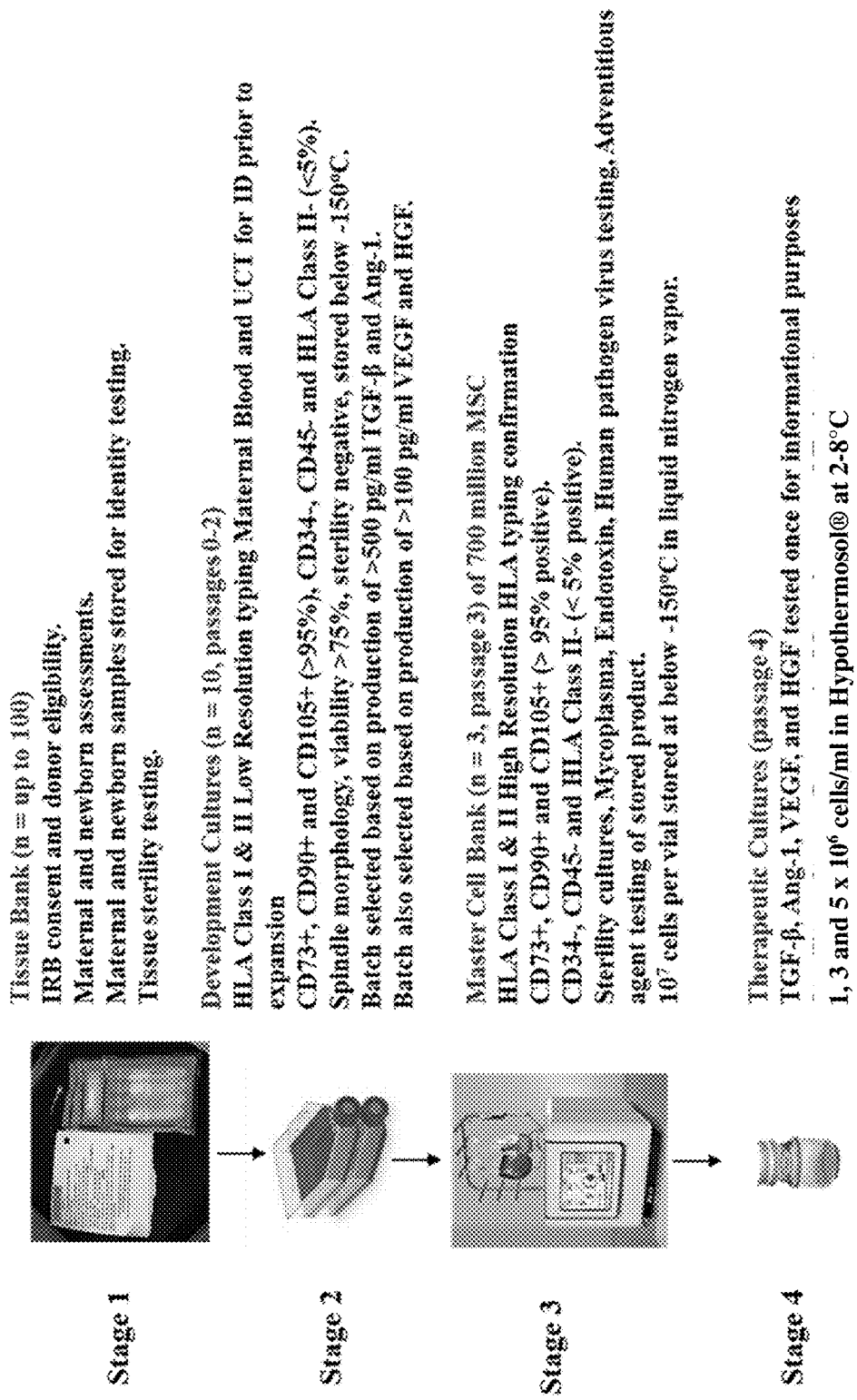
FIG. 1 shows a flow-diagram schematically representing the experimental steps of an illustrative example of a method of producing a therapeutic composition containing a MSC population with suitable wound healing potency. This method includes identifying a tissue suitable as starting material for producing a MSC population, assessing the wound healing potency of the MSC population, selecting a MSC population for producing a master cell bank and selecting a MSC population for pharmaceutical administration. The stem cells used in this example are isolated from the amniotic membrane of the umbilical cord—also referred herein to as cord lining stem cells (CLSC). This example starts with setting up a tissue bank comprising the umbilical cord tissue, which can be used as starting material for MSC cultivation. For this purpose, donor consent for the tissue donation may be obtained (stage 1). Further, maternal and newborn blood samples are screened for infectious diseases and the umbilical cords are tested for microbial contamination. Up to, for example, 100 umbilical cord samples may be collected in such a tissue bank. Tissue having found to be uncritical with respect to contamination or infectious diseases of the door is used for development cultures that are used to produce pure MSC lines (stage 2). For this purpose, outgrowths from about 10 individual amniotic membranes of the umbilical cord are cultivated for 0 to 2 passages for propagation. MSCs from Passage 2 (P2) are assessed by flow cytometry for MSC markers, and supernatants are assessed for cytokine production. The in-process release criteria for MSCs at stage 2 include >95% positive for CD73, CD90, CD105, and <5% positive for CD34, CD45 and HLA-DR, with >500 pg/ml production in vitro of Angiopoietin-1 and TGF-β, and >100 pg/ml of VEGF and HGF and negative sterility. Cell lines that meet the stage 2 in-process release criteria are then further propagated in a Terumo Quantum bioreactor for stage 3 of the manufacturing process. The in-process release criteria for MSCs at stage 3 include >95% positive for CD73, CD90, CD105, and <5% positive for CD34, CD45 and HLA-DR, tested for sterility, endotoxin, mycoplasma, human pathogen virus and adventitious virus. Mesenchymal cell lines (populations) that passed the tests are banked as master cell bank (stage 3). Master cell banks are thawed and seeded into cultures and release criteria are sterility, mycoplasma and endotoxin and finally 1×, 3× and 5×10$^6$ MSCs that passed the tests are bottled in carrier medium such as 1 ml Hypothermosol® and stored at 2-8° C. before pharmaceutical administration (stage 4).
Figure 2A:
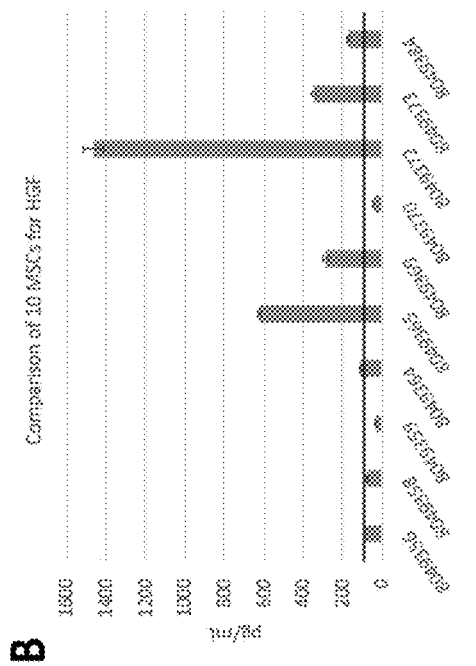
FIGS. 2A-2D show the result of a secretion level analysis of Ang-1, VEGF, HGF and TGF-β (here TGF-β1) in 10 individual MSC populations obtained from 10 different umbilical cord donors cultivated as described for FIG. 1 post-stage 2.
Figure 2B:
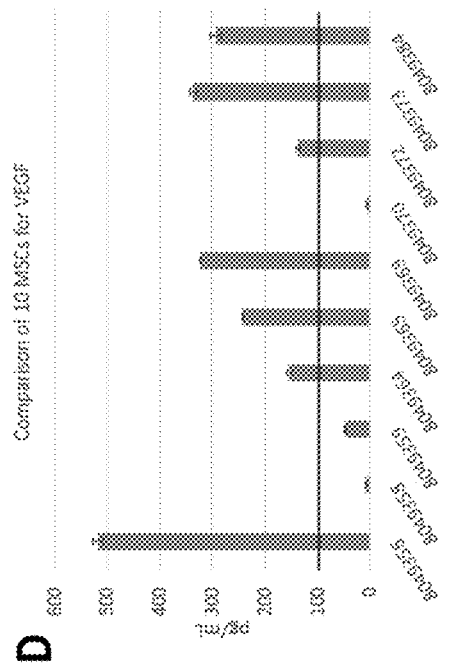
Figure 2C:
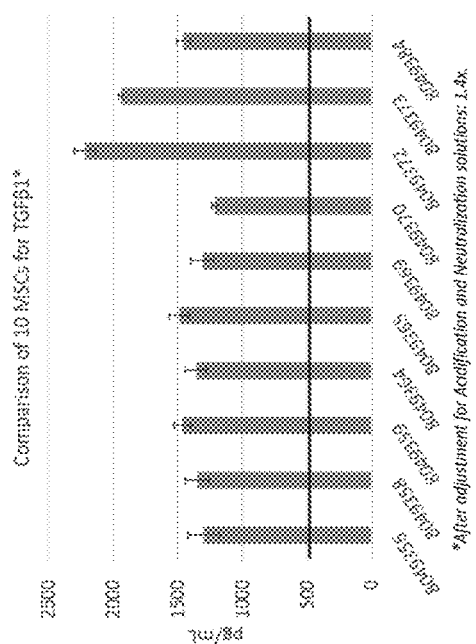
Figure 2D:
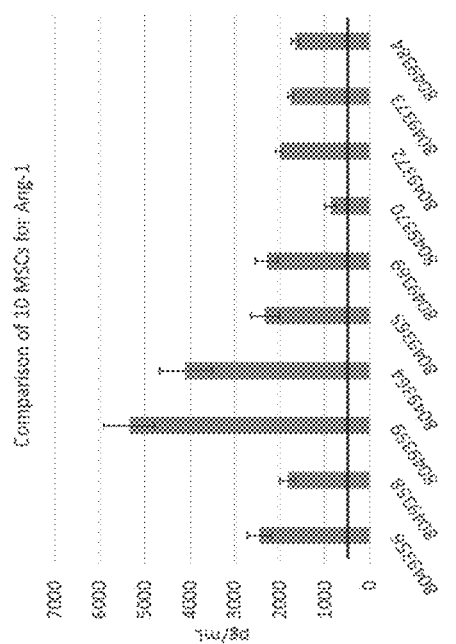

The present invention is directed to several methods that are all suitable for validation and/or as quality control for various stages of a GMP manufacturing process of mesenchymal stem cell populations for therapeutic use. All these methods make use of determining in a medium the level of at least one protein selected from the group consisting of Ang-1, TGF-β, VEGF and HGF secreted into the medium by the mesenchymal stem cell population.

It has thus been surprisingly found here that determining the secretion level of Ang-1, TGF-β, VEGF and HGF in a medium of a MSC population is a suitable criterion for several aspects in a GMP manufacturing process of the MSC population. Determining the secretion level of Ang-1, TGF-β, VEGF and HGF in a medium in which an MSC population is cultivated or stored, may be used to assess the wound healing potency of the MSC population, to identify a (donor) tissue suitable as starting material for producing a MSC population with suitable wound healing potency, to select a MSC population for cGMP production, or to select a MSC population for subsequent pharmaceutical administration or to generate a master cell bank. Additionally, determining the secretion level of Ang-1, TGF-β, VEGF and HGF can be used for identifying a medium suitable for inducing or improving wound healing properties of a mesenchymal stem cell population.

It is noted here that involvement of Ang-1, TGF-β1, VEGF and HGF in the wound healing process is known to the person skilled in the art. For the involvement of Ang-1 (SEQ ID NO: 1) in wound healing, see, for example, Li et al. Stem Cell Research & Therapy 2013, 4:113 "Mesenchymal stem cells modified with angiopoietin-1 gene promote wound healing" or Bitto et al, "Angiopoietin-1 gene transfer improves the impaired wound healing of the genetically diabetic mice without increasing VEGF expression", Clinical Science May 14, 2008, 114 (12) 707-718. In the study of Li et al, the Ang-1 gene was inserted into bone marrow mesenchymal stem cells and the results showed that that"*Ang1-MSCs significantly promoted wound healing with increased epidermal and dermal regeneration, and enhanced angiogenesis compared with MSCs, Ad-Ang1 or sham treatment.*" Notably, Li et al authors state that MSCs alone do not produce enough Ang-1 and for this reason, the authors inserted the Ang-1-gene into the MSC to come up with a genetically modified cell.

For the involvement of Transforming Growth Factor Beta, including TGF-β1 (SEQ ID NO: 2, TGF-β2, and TGF-β3, in wound healing, in particular healing of chronic/non-healing wounds see for example, Ramirez et al. "The Role of TGFb Signaling in Wound Epithelialization" Advances In Wound Care, Volume 3, Number 7, 2013, 482-491 or Pakyari et al., Critical Role of Transforming Growth Factor Beta in Different Phases of Wound Healing, Advances In Wound Care, Volume 2, Number 5, 2012, 215-224.

For the involvement of VEGF (SEQ ID NO: 3) in wound healing, in particular healing of chronic/non-healing wounds, see for example Froget et al., Eur. Cytokine Netw., Vol. 14, March 2003, 60-64 or Bao et al., "The Role of Vascular Endothelial Growth Factor in Wound Healing" J Surg Res. 2009 May 15; 153(2): 347-358.

Reverting to HGF (SEQ ID NO: 4) in wound healing, in particular healing of chronic/non-healing wounds, see for example, Yoshida et al., "Neutralization of Hepatocyte Growth Factor Leads to Retarded Cutaneous Wound Healing Associated with Decreased Neovascularization and Granulation Tissue Formation" J. Invest. Dermatol. 120: 335-343, 2003, Li, Jin-Feng et al. "HGF Accelerates Wound Healing by Promoting the Dedifferentiation of Epidermal Cells through β1-Integrin/ILK Pathway." BioMed Research International 2013 (2013): 470418 or Conway et al, "Hepatocyte growth factor regulation: An integral part of why wounds become chronic". Wound Rep Reg (2007) 15 683-692.

Wound healing potency may describe the capability, ability, competence or effectiveness to facilitate or accelerate wound healing. In the present invention, a MSC population is considered to have sufficient wound healing potency, for example, or a tissue is considered to be suitable for be suitable as starting material for producing a pharmaceutically suitable MSC population, if the secretion level (also referred to as concentration) of one, two, three or all four of Ang-1, TGF-β, VEGF and HGF is equal or higher than a threshold specific for each of these protein as defined herein (cf. also Example 2). Thus, assessing wound healing comprises determining the secretion level of Ang-1, TGF-β, VEGF and HGF and subsequent determination of whether the specific thresholds are reached or exceeded. Assessing the wound healing potency of a MSC population may be performed during different stages of MSC cultivation. The wound healing potency may be assessed on tissue directly before MSC cultivation to identify a tissue suitable as starting material for producing a MSC population having wound healing potency and thus may being suitable for subsequent pharmaceutical use. To be suitable for pharmaceutical application, a MSC population may have to be produced under current Good Manufacturing Practice (cGMP) conditions. Thus, determining the secretion level of Ang-1, TGF-β, VEGF and HGF before producing a MSC population may be suitable to select a MSC population for producing a MSC population under cGMP conditions. Further, a MSC population can be selected for subsequent pharmaceutical administration using the methods described herein.

A MSC population selected according to the present invention may also be used for generating a master cell bank. In this context, the selected MSC population may be further characterized and tested for integrity and contaminants such as bacteria, fungi, mycoplasmas and viruses before cryopreservation. Once set up, a MSC master cell bank may allow an expansion of a specific MSC population to form cultures for further research or production processes whenever needed. For example, a MSC master cell bank comprising MSC with wound healing properties may allow the expansion of a specific MSC population may secreting an amount of Ang-1, TGF-β, VEGF and HGF that is ideal for wound healing.

The secretion level of Ang-1, TGF-β, VEGF and/or HGF is used as selection criterion in the methods described herein. A secretion level equaling or exceeding a threshold may, for example, indicate (i) potency for wound healing of a MSC population or (ii) a tissue or an isolated cell population being suitable as starting material for producing a MSC population. In the present invention, the threshold for Ang-1 may be about 100 pg/ml, about 200 pg/ml, about 300 pg/ml, about 400 pg/ml, about 500 pg/ml, about 600 pg/ml, about 700 pg/ml, about 800 pg/ml, about 900 pg/ml or about 1000 pg/ml. Preferably, for Ang-1 the threshold is about 500 pg/ml. The threshold for TGF-β may be about 100 pg/ml, about 200 pg/ml, about 300 pg/ml, about 400 pg/ml, about 500 pg/ml, about 600 pg/ml, about 700 pg/ml, about 800 pg/ml, about 900 pg/ml or about 1000 pg/ml. Preferably, for TGF-β the threshold is about 500 pg/ml. Regarding VEGF, the threshold may be about 80 pg/ml, about 100 pg/ml, about 120 pg/ml, about 140 pg/ml, about 160 pg/ml, about 180 pg/ml or about 200 pg/ml, wherein the threshold for VEGF preferably is about 100 pg/ml. Turning to HGF the threshold may be about 80 pg/ml, about 100 pg/ml, about 120 pg/ml, about 140 pg/ml, about 160 pg/ml, about 180 pg/ml or about 200 pg/ml. Preferably, for HGF the threshold is about 100 pg/ml.

In one example of the present invention, the following threshold levels (values) are used:
  a threshold of about 400 pg/ml for Angiopoietin 1 (Ang-1)
  a threshold of about 400 pg/ml for Transforming Growth Factor beta (TGF-β)
  a threshold of about 80 pg/ml for Vascular Endothelial Growth Factor (VEGF)
  a threshold of about 80 pg/ml for Hepatocyte Growth Factor (HGF).

In another example of the present invention, the following threshold levels (values) are used:
  a threshold of about 500 pg/ml for Angiopoietin 1 (Ang-1)
  a threshold of about 500 pg/ml for Transforming Growth Factor beta (TGF-β)
  a threshold of about 100 pg/ml for Vascular Endothelial Growth Factor (VEGF)
  a threshold of about 100 pg/ml for Hepatocyte Growth Factor (HGF).

In these two examples, the secretion level of all four proteins equal or exceed their respective threshold value of the secretion level/concentration (cf. Example 2) in order to, for example, consider a MSC population to have suitable wound healing properties or to consider a tissue to be a suitable starting material for producing a pharmaceutically suitable MSC population. It is noted here that the concentrations determined in the present invention and thus the threshold levels are preferably absolute concentrations.

Any pharmaceutically suitable MSC population can be used in the present invention. Thus, the MSC population may be derived from any mammalian tissue or compartment/body part known to contain MSC. In illustrative examples, the MSC population may be a MSC population of the umbilical cord, a placental MSC population, a MSC population of the cord-placenta junction, a MSC population of the cord blood, a MSC of the bone marrow, or an adipose-tissue derived MSC population. The MSC population of the umbilical cord may be (derived) from any compartment of umbilical cord tissue that contains MSCs such as the amnion, a perivascular MSC population, a MSC population of Wharton's jelly, a MSC population of the amniotic membrane of umbilical cord but also a mixed MSC population of the umbilical cord, meaning a population of MSCs that includes stem cells of two or more of these compartments. MSCs of these compartments and their isolation therefrom are known to the person skilled in the art and are described, for example, by Subramanian et al "Comparative Characterization of Cells from the Various Compartments of the Human Umbilical Cord Shows that the Wharton's Jelly Compartment Provides the Best Source of Clinically Utilizable Mesenchymal Stem Cells", PLoS ONE 10(6): e0127992, 2015 and the references cited therein, Van Pham et al. "Isolation and proliferation of umbilical cord tissue derived mesenchymal stem cells for clinical applications", Cell Tissue Bank (2016) 17:289-302, 2016. A mixed MSC population of the umbilical cord can, for example, be obtained by removing the arteries and veins from the umbilical cord tissue, cutting the remaining tissue and the Wharton's jelly into piece and cultivating the umbilical cord tissue (by tissue explant) in the culture medium of the present invention. A mixed MSC population of the umbilical cord may also be obtained by culturing entire umbilical cord tissue with intact umbilical vessels as tissue explant under the conditions (cultivation in serum-supplemented DMEM with 10% fetal bovine serum, 10% horse serum, and 1% Penicillin/Streptomycin) as described by Schugar et al. "High harvest yield, high expansion, and phenotype stability of CD146 mesenchymal stromal cells from whole primitive human umbilical cord tissue. Journal of biomedicine & biotechnology. 2009; 2009:789526". In this context, it is noted that a MSC population of the cord-placenta junction can be isolated as described by Beeravolu et al. "Isolation and Characterization of Mesenchymal Stromal Cells from Human Umbilical Cord and Fetal Placenta." J Vis Exp. 2017; (122): 55224. In examples of the present invention, the MSC population if derived from an umbilical cord or the amniotic membrane of the umbilical cord (cf. Example 1-4). A MSC population of the amniotic membrane of umbilical cord may be highly defined and homogenous. Thus, in one embodiment of the present invention, a mesenchymal stem cell population as described in International Application WO 2018/067071 is used. Thus, in typical examples of the method at least about 90% or more, about 91% or more, about 92% or more, about 93% or more, about 94% or more, about 95% or more, about 96% or more, about 97% or more, about 98% or more about 99% or more of the MSCs express the following markers: CD73 (SEQ ID NO. 5), CD90 (SEQ ID NO. 6) and CD105 (SEQ ID NO. 7). In addition, in these examples at least about 90% or more, about 91% or more, about 92% or more, about 93% or more, about 94% or more, about 95% or more, about 96% or more, about 97% or more, about 98% or more, about 99% or more of the MSCs may lack expression of the following markers: CD34 (SEQ ID NO. 8), CD45 (SEQ ID NO. 9) and HLA-DR (SEQ ID NO. 10). In particular examples, about 97% or more, about 98% or more, or about 99% or more of the MSC population express CD73, CD90 and CD105 while lacking expression of CD34, CD45 and HLA-DR. In preferred examples at least about 91% or more, about 92% or more, about 93% or more, about 94% or more, about 95% or more, about 96% or more, about 97% or more, about 98% or more about 99% or more cells of the MSC population express each of CD73, CD90 and CD105 while at least about 90% or more, about 91% or more, about 92% or more, about 93% or more, about 94% or more, about 95% or more, about 96% or more, about 97% or more, about 98% or more about 99% or more of the MSC may lack expression of CD34, CD45 and HLA-DR. In particular examples about 97% or more, about 98% or more, or about 99% or more of the MSC population express CD73, CD90 and CD105 while lacking expressing of CD34, CD45 and HLA-DR.

In the present invention, the level of Ang-1, TGF-β, VEGF and HGF is typically determined in the supernatant of the medium in which a MSC population is either stored, transported or cultivated in. An MSC population may be stored for a long or for a short term. Examples for long term storage media include but are not limited to glycerol and trehalose, allowing a storage at about −80° C., or a cryoprotectant such as dimethylsulfoxide (DMSO), allowing a storage at about −195° C. Short term storage may comprise transport to an administration site (such as an doctor office's or hospital) and/or storage for a period of time till the MSC population will be administered to a subject. The excipient HypoThermosol® is an illustrative example for a short term storage medium. This preservation medium is suitable for transportation, allowing a MSC storage at about 2 to 8° C. Another example for a medium suitable for transportation is Plasmalyte. Examples for media suitable for MSC cultivation may comprise, but are not limited to commercial available medium such as CTS StemPro MSC SFM, MesenPRO RS Medium, StemPro MSC SFM XenoFree. In one example of the present invention, the MSC cell culture medium may be the cultivation medium PTT6 that is described in International Application WO 2018/067071. In accordance with the disclosure of International Application WO 2018/067071 the MSC cell culture medium may thus comprise Dulbecco's modified eagle medium (DMEM), Ham's F12 Medium (F12), a serum free basal medium such as M171 and Fetal Bovine Serum (FBS). Thus, in one example, the medium may comprise DMEM in a final concentration of about 55 to 65% (v/v), F12 in a final concentration of about 5 to 15% (v/v), M171 in a final concentration of about 15 to 30% (v/v) and FBS in a final concentration of about 1 to 8% (v/v). The value of "% (v/v)" as used herein refers to the volume of the individual component relative to the final volume of the medium. This means, if DMEM is, for example, present in the medium a final concentration of about 55 to 65% (v/v), 1 liter of medium contains about 550 to 650 ml DMEM. In other examples, the medium may comprise DMEM in a final concentration of about 57.5 to 62.5% (v/v), F12 in a final concentration of about 7.5 to 12.5% (v/v), M171 in a final concentration of about 17.5 to 25.0% (v/v) and FBS in a final concentration of about 1.75 to 3.5% (v/v). In further examples, the medium may comprise DMEM in a final concentration of about 61.8% (v/v), F12 in a final concentration of about 11.8% (v/v), M171 in a final concentration of about 23.6% (v/v) and FBS in a final concentration of about 2.5% (v/v). In addition to the above-mentioned components, the medium may comprise supplements that are advantageous for MSC cultivation. In the present invention, the MSC culture medium may, for example, comprise Epidermal Growth Factor (EGF). If present, EGF may be present in the culture medium in a final concentration of about 1 ng/ml to about 20 ng/ml. In some of these examples, the culture medium may comprise EGF in a final concentration of about 10 ng/ml. The culture medium of the present invention may also comprise insulin. If present, insulin may be present in a final concentration of about 1 μg/ml to 10 μg/ml. In some of these examples, the culture medium may comprise Insulin in a final concentration of about 5 μg/ml. The culture medium may further comprise at least one of the following supplements: adenine, hydrocortisone, and 3,3',5-Triiodo-L-thyronine sodium salt (T3). In such examples, the culture medium may comprise all three of adenine, hydrocortisone, and 3,3',5-Triiodo-L-thyronine sodium salt (T3). In these examples, the culture medium may comprise adenine in a final concentration of about 0.05 to about 0.1 μg/ml adenine, hydrocortisone in a final concentration of about 1 to about 10 μg/ml hydrocortisone and/or 3,3',5-Triiodo-L-thyronine sodium salt (T3) in a final concentration of about 0.5 to about 5 ng/ml. In this context, it is noted that by cultivating a MSC population in a medium as described herein, the expression and/or secretion of at least one protein selected from the group consisting of Ang-1, TGF-β, VEGF and HGF may be increased.

In the present method, it may be required to subject the medium to centrifugation for determining the concentration of Ang-1, TGF-β, VEGF and HGF in the medium that contains the MSC, typically after a suitable period of time. In this context, a suitable period of time may be any incubation period (if the cell population is, for example stored, or transported in a storage or transport medium such as Hypothermosol) or cultivation period (if the cell population is cultivated in culture medium) are suitable for a MSC population to secrete proteins in a detectable amount. In an illustrative example, a suitable period of time may be an incubation or cultivation period of about 6 h, about 12 h, about 18 h, about 24 h, about 30 h, about 36 h, about 42 h, about 46 h, about 48 h, about 50 h or about 54 h. After centrifugation, the supernatant of the centrifuged medium may be subjected to an immunoassay to determine the levels/concentration of the secreted proteins. Any immunoassay suitable to detect one or multiple secreted proteins in a medium can be applied in the present invention. Illustrative examples of suitable immunoassays for detecting protein in a medium are an Enzyme-linked Immunosorbent Assay (ELISA) or a singleplex assay. Singleplex assays (that are commercially available, for example, from BioVendor, Brno, Czech Republic under the trade name Q-Plex or from R&D Systems Inc, Minneapolis, USA) may be carried out by placing two spots consisting of capture antibodies in a defined array to the bottom of each well of a 96-well ELISA plate (in addition to the assay spot, the second spot is a positive control spot for assuring proper assay procedure). An example of a suitable assay that detects multiple proteins in a medium is a multiplex assay. In such a multiplex assay multiple analytes can be immobilized on a solid surface such as an ELISA plate, which separates the analytes spatially. Alternatively, a multiplex assay may also be carried out using analytes that have been immobilized on beads or particles. In such a case, the assays for each analyte employs different bead/particles. In illustrative examples, a bead based multiplex assay may be used to detect secreted Ang-1, TGF-β, VEGF and HGF in a medium (cf. Example 1 and Example 4). Such multiplex assay systems for simultaneously detecting and quantifying multiple target analytes in complex samples such as cell culture medium are commercially available, for example, from R&D Systems Inc, Minneapolis, USA as Luminex® Assays and Luminex® High Performance Assays.

The present invention is also directed to a use of at least one protein selected from the group consisting of Ang-1, TGF-β, VEGF and HGF for assessing the wound healing potency of a MSC population. Further, the present invention is directed to a use of at least one protein selected from the group consisting of Ang-1, TGF-β, VEGF and HGF for selecting a MSC population for producing a stem cell population under cGMP conditions. Consequently, the present invention is directed to a use of at least one protein selected from the group consisting of Ang-1, TGF-β, VEGF and HGF for selecting a MSC population for producing a stem cell population for subsequent pharmaceutical administration. The present invention is further directed to a use of at least one protein selected from the group consisting of Ang-1, TGF-β, VEGF and HGF for selecting a MSC population for generating a master cell bank.

Additionally, the present invention is directed to a use of at least one protein selected from the group consisting of Ang-1, TGF-β, VEGF and HGF for selecting a MSC population for identifying a tissue suitable as starting material for producing a MSC population for pharmaceutical use. In the present invention, such tissue may be any mammalian tissue or compartment/body part known to contain MSCs. Examples for such tissue include, but are not limited to bone marrow, adipose-tissue, placental tissue, tissue of the cord-placenta junction, umbilical cord tissue such as Wharton's Jelly, the amniotic membrane of the umbilical cord to name only a few known tissue sources for MSCs. In an example, the tissue is an umbilical cord or the amniotic membrane of the umbilical cord and the MSC population produced therefrom may be a MSC population of the amniotic membrane of umbilical cord.

For determining whether a tissue, for example, from a particular donor is suitable as a starting material for producing an MSC population for pharmaceutical use, the tissue can, for example, be directly cultivated as tissue explant. For such tissue explant, a sample of the respective tissue (for example, Wharton's Jelly, the placental amnion or the amniotic membrane of the umbilical cord) can be placed in tissue culture dishes and cultivated in a suitable cultivation/growth medium as described here (cf. also U.S. Pat. Nos. 9,085,755, or 9,737,568 in this respect). Cell outgrowth from the tissue (migration of MSCs out of the tissue onto the surface of the culture dish) will then occur after an suitable period of cultivation and the culture medium can then be analyzed for the secretion of Ang-1, TGF-β, VEGF and HGF. Alternatively, the MSC population can first be isolated from the chosen tissue using a known isolation method and the isolated MSC population can then be cultivated in a suitable medium and checked for the secretion of Ang-1, TGF-β, VEGF and HGF. Independently from the tissue, the use of Ang-1, TGF-β, VEGF and HGF for the methods described herein may comprise determining in the medium at least one, at least two, at least three or all four of said proteins secreted into the medium by the MSC population or by a tissue sample or by a cell isolated from the tissue sample.

The present invention is further directed to a method of identifying a medium suitable for suitable for inducing or improving wound healing properties of a mesenchymal stem cell population. Also this method comprises determining the level of at least one protein selected from the group consisting of Ang-1, TGF-β, VEGF and HGF secreted into the cell culture medium by the MSC population. Consequently, the present invention is also directed to the use of at least one protein for identifying a medium suitable suitable for inducing or improving wound healing properties of a mesenchymal stem cell. This use may comprise determining in the cell culture medium the level of at least two, at least three or all four proteins selected from the group consisting of Ang-1, TGF-β, VEGF and HGF secreted into the cell culture medium by the mesenchymal stem cell population.

The invention will be further illustrated by the following non-limiting Experimental Examples.

Sequences of polypeptides disclosed herein are depicted in Table 1.

TABLE 1

| SEQ ID NO. | Polypeptide | Sequence |
|---|---|---|
| 1 | Human Ang-1 Uniprot no: Q15389 version number 2 as of Jan. 1, 1998 | MTVFLSFAFLAAILTHIGCSNQRRSPENSGRRYNRIQHGQCAYTFILPEHD GNCRESTTDQYNTNALQRDAPHVEPDFSSQKLQHLEHVMENYTQWLQ KLENYIVENMKSEMAQIQQNAVQNHTATMLEIGTSLLSQTAEQTRKLTD VETQVLNQTSRLEIQLLENSLSTYKLEKQLLQQTNEILKIHEKNSLLEHKI LEMEGKHKEELDTLKEEKENLQGLVTRQTYIIQELEKQLNRATTNNSVL QKQQLELMDTVHNLVNLCTKEGVLLKGGKREEEKPFRDCADVYQAGF NKSGIYTIYINNMPEPKKVFCNMDVNGGGWTVIQHREDGSLDFQRGWK EYKMGFGNPSGEYWLGNEFIFAITSQRQYMLRIELMDWEGNRAYSQYD RFHIGNEKQNYRLYLKGHTGTAGKQSSLILHGADFSTKDADNDNCMCK CALMLTGGWWFDACGPSNLNGMFYTAGQNHGKLNGIKWHYFKGPSYS LRSTTMMIRPLDF |
| 2 | Human TGFbeta1 Uniprot no: P36897 version number 1 as of Jun. 1, 1994 | MEAAVAAPRPRLLLLVLAAAAAAAAALLPGATALQCFCHLCTKDNFTC VTDGLCFVSVTETTDKVIHNSMCIAEIDLIPRDRPFVCAPSSKTGSVTTTY CCNQDHCNKIELPTTVKSSPGLGPVELAAVIAGPVCFVCISLMLMVYICH NRTVIHHRVPNEEDPSLDRPFISEGTTLKDLIYDMTTSGSGSGLPLLVQRT IARTIVLQESIGKGRFGEVWRGKWRGEEVAVKIFSSREERSWFREAEIYQ TVMLRHENILGFIAADNKDNGTWTQLWLVSDYHEHGSLFDYLNRYTVT VEGMIKLALSTASGLAHLHMEIVGTQGKPAIAHRDLKSKNILVKKNGTC CIADLGLAVRHDSATDTIDIAPNHRVGTKRYMAPEVLDDSINMKHFESF KRADIYAMGLVFWEIARRCSIGGIHEDYQLPYYDLVPSDPSVEEMRKVV CEQKLRPNIPNRWQSCEALRVMAKIMRECWYANGAARLTALRIKKTLS QLSQQEGIKM |
| 3 | Human VEGFA Uniprot no: P15692 version number 2 as of Nov. 16, 2001 | MNFLLSWVHWSLALLLYLHHAKWSQAAPMAEGGGQNHHEVVKFMDV YQRSYCHPIETLVDIFQEYPDEIEYIFKPSCVPLMRCGGCCNDEGLECVPT EESNITMQIMRIKPHQGQHIGEMSFLQHNKCECRPKKDRARQEKKSVRG KGKGQKRKRKKSRYKSWSVYVGARCCLMPWSLPGPHPCGPCSERRKH LFVQDPQTCKCSCKNTDSRCKARQLELNERTCRCDKPRR |
| 4 | Human HGF Uniprot no: P14210 | MWVTKLLPALLLQHVLLHLLLLPIAIPYAEGQRKRRNTIHEFKKSAKTTL IKIDPALKIKTKKVNTADQCANRCTRNKGLPFTCKAFVFDKARKQCLWF PFNSMSSGVKKEFGHEFDLYENKDYIRNCIIGKGRSYKGTVSITKSGIKCQ |

| SEQ ID NO. | Polypeptide | Sequence |
|---|---|---|
| | version number 2 as of Aug. 1, 1991 | PWSSMIPHEHSFLPSSYRGKDLQENYCRNPRGEEGGPWCFTSNPEVRYE VCDIPQCSEVECMTCNGESYRGLMDHTESGKICQRWDHQTPHRHKFLPE RYPDKGFDDNYCRNPDGQPRPWCYTLDPHTRWEYCAIKTCADNTMND TDVPLETTECIQGQGEGYRGTVNTIWNGIPCQRWDSQYPHEHDMTPENF KCKDLRENYCRNPDGSESPWCFTTDPNIRVGYCSQIPNCDMSHGQDCYR GNGKNYMGNLSQTRSGLTCSMWDKNMEDLHRHIFWEPDASKLNENYC RNPDDDAHGPWCYTGNPLIPWDYCPISRCEGDTTPTIVNLDHPVISCAKT KQLRVVNGIPTRTNIGWMVSLRYRNKHICGGSLIKESWVLTARQCFPSR DLKDYEAWLGIHDVHGRGDEKCKQVLNVSQLVYGPEGSDLVLMKLAR PAVLDDFVSTIDLPNYGCTIPEKTSCSVYGWGYTGLINYDGLLRVAHLYI MGNEKCSQHHRGKVTLNESEICAGAEKIGSGPCEGDYGGPLVCEQHKM RMVLGVIVPGRGCAIPNRPGIFVRVAYYAKWIHKIILTYKVPQS |
| 5 | CD73 identifier P21589 of Uniprot, version number 1 as of May 1, 1991: | MCPRAARAPATLLLALGAVLWPAAGAWELTILHTNDVHSRLEQTSEDS SKCVNASRCMGGVARLFTKVQQIRRAEPNVLLLDAGDQYQGTIWFTVY KGAEVAHFMNALRYDAMALGNHEFDNGVEGLIEPLLKEAKFPILSANIK AKGPLASQISGLYLPYKVLPVGDEVVGIVGYTSKETPFLSNPGTNLVFED EITALQPEVDKLKTLNVNKIIALGHSGFEMDKLIAQKVRGVDVVVGGHS NTFLYTGNPPSKEVPAGKYPFIVTSDDGRKVPVVQAYAFGKYLGYLKIEFD ERGNVISSHGNPILLNSSIPEDPSIKADINKWRIKLDNYSTQELGKTIVY LDGSSQSCRFRECNMGNLICDAMINNNLRHTDEMFWNHVSMCILNGGG IRSPIDERNNGTITHVVYDLSRKPGDRVVKLDVLCTKCRVPSYDPLKMDE VYKVILPNFLANGGDGFQMIKDELLRHDSGDQDINVVSTYISKMKVIYP AVEGRIKFSTGSHCGSFSLIFLSLWAVIFVLYQ |
| 6 | CD90 identifier P04216 of Uniprot, version number 2 as of May 2, 2002: | MNLAISIALLLTVLQVSRGQKVTSLTACLVDQSLRLDCRHENTSSSPIQY EFSLTRETKKHVLFGTVGVPEHTYRSRTNFTSKYNMKVLYLSAFTSKDE GTYTCALHHSGHSPPISSQNVTVLRDKLVKCEGISLLAQNTSWLLLLLS LSLLQATDFMSL |
| 7 | CD105 identifier P17813 of Uniprot, version number 2 as of Jul. 15, 1998: | MDRGTLPLAVALLLASCSLSPTSLAETVHCDLQPVGPERGEVTYTTSQVS KGCVAQAPNAILEVHVLFLEFPTGPSQLELTLQASKQNGTWPREVLLVL SVNSSVFLHLQALGIPLHLAYNSSLVTFQEPPGVNTTELPSFPKTQILEWA AERGPITSSAELNDPQSILLRLGQAQGSLSFCMLEASQDMGRTLEWRPRT PALVRGCHLEGVAGHKEAHILRVLPGHSAGPRTVTVKVELSCAPGDLDA VLILQGPPYVSWLIDANHNMQIWTTGEYSFKIFPEKNIRGFKLPDTPQGL LGEARMLNASIVASFVELPLASIVSLHASSCGGRLQTSPAPIQTTPPKDTC SPELLMSLIQTKCADDAMTLVLKKELVAHLKCTITGLTFWDPSCEAEDR GDKFVLRSAYSSCGMQVSASMISNEAVVNILSSSSPQRKKVHCLNMDSL SFQLGLYLSPHFLQASNTIEPGQQSFVQVRVSPSVSEFLLQLDSCHLDLGP EGGTVELIQGRAAKGNCVSLLSPSPEGDPRFSFLLHFYTVPIPKTGTLSCT VALRPKTGSQDQEVHRTVFMRLNIISPDLSGCTSKGLVLPAVLGITFGAF LIGALLTAALWYIYSHTRSPSKREPVVAVAAPASSESSSTNHSIGSTQSTP CSTSSMA |
| 8 | CD34 identifier P28906 of Uniprot, version number 2 as of Jul. 15, 1998: | MLVRRGARAGPRMPRGWTALCLLSLLPSGFMSLDNNGTATPELPTQGTFS NVSTNVSYQETTTPSTLGSTSLHPVSQHGNEATTNITETTVKFTSTSVIT SVYGNTNSSVQSQTSVISTVFTTPANVSTPETTLKPSLSPGNVSDLSTTS TSLATSPTKPYTSSSPILSDIKAEIKCSGIREVKLTQGICLEQNKTSSCA EFKKDRGEGLARVLCGEEQADADAGAQVCSLLLAQSEVRPQCLLLVLANR TEISSKLQLMKKHQSDLKKLGILDFTEQDVASHQSYSQKTLIALVTSGAL LAVLGITGYFLMNRRSWSPTGERLGEDPYYTENGGGQGYSSGPGTSPEAQ GKASVNRGAQENGTGQATSRNGHSARQHVVADTEL |
| 9 | CD45 identifier P08575 of Uniprot, version number 2 as of Jul. 19, 2003: | MYLWLKLLAFGFAFLDTEVFVTGQSPTPSPTGLTTAKMPSVPLSSDPLPT HTTAFSPASTFERENDFSETTTSLSPDNTSTQVSPDSLDNASAFNTTGVSS VQTPHLPTHADSQTPSAGTDTQTFSGSAANAKLNPTPGSNAISDVPGERS TASTFPTDPVSPLTTTLSLAHHSSAALPARTSNTTITANTSDAYLNASETT TLSPSGSAVISTTTIATTPSKPTCDEKYANITVDYLYNKETKLFTAKLNVN ENVECGNNTCTNNEVHNLTECKNASVSISHNSCTAPDKTLILDVPPGVEK FQLHDCTQVEKADTTICLKWKNIETFTCDTQNITYRFQCGNMIFDNKEIK LENLEPEHEYKCDSEILYNNHKFTNASKIIKTDFGSPGEPQIIFCRSEAAH QGVITWNPPQRSFHNFTLCYIKETEKDCLNLDKNLIKYDLQNLKPYTKYV LSLHAYIIAKVQRNGSAAMCHFTTKSAPPSQVWNMTVSMTSDNSMHVK CRPPRDRNGPHERYHLEVEAGNTLVRNESHKNCDFRVKDLQYSTDYTFK AYFHNGDYPGEPFILHHSTSYNSKALIAFLAFLIIVTSIALLVVLYKIYDL HKKRSCNLDEQQELVERDDEKQLMNVEPIHADILLETYKRKIADEGRLF LAEFQSIPRVFSKFPIKEARKPFNQNKNRYVDILPYDYNRVELSEINGDAG SNYINASYIDGKEPRKYIAAQGPRDETVDDFWRMIWEQKATVIVMVTR CEEGNRNKCAEYWPSMEEGTRAFGDVVVKINQHKRCPDYIIQKLNIVNK KEKATGREVTHIQFTSWPDHGVPEDPHLLLKLRRRVNAFSNFFSGPIVVH CSAGVGRTGTYIGIDAMLEGLEAENKVDVYGYVVKLRRQRCLMVQVE |

TABLE 1-continued

| SEQ ID NO. | Polypeptide | Sequence |
|---|---|---|
| | | AQYILIHQALVEYNQFGETEVNLSELHPYLHNMKKRDPPSEPSPLEAEFQ RLPSYRSWRTQHIGNQEENKSKNRNSNVIPYDYNRVPLKHELEMSKESE HDSDESSDDDSDSEEPSKYINASFIMSYWKPEVMIAAQGPLKETIGDFWQ MIFQRKVKVIVMLTELKHGDQEICAQYWGEGKQTYGDIEVDLKDTDKS STYTLRVFELRHSKRKDSRTVYQYQYTNWSVEQLPAEPKELISMIQVVK QKLPQKNSSEGNKHHKSTPLLIHCRDGSQQTGIFCALLNLLESAETEEVV DIFQVVKALRKARPGMVSTFEQYQFLYDVIASTYPAQNGQVKKNNHQE DKIEFDNEVDKVKQDANCVNPLGAPEKLPEAKEQAEGSEPTSGTEGPEH SVNGPASPALNQGS |
| 10 | HLA-DR identifier P01903 of Uniprot, version number 1 as of Jul. 21, 1986: | MAISGVPVLGFFIIAVLMSAQESWAIKEEHVIIQAEFYLNPDQSGEFMFDF DGDEIFHVDMAKKETVWRLEEFGRFASFEAQGALANIAVDKANLEIMT KRSNYTPITNVPPEVTVLTNSPVELREPNVLICFIDKFTPPVVNVTWLRNG KPVTTGVSETVFLPREDHLFRKFHYLPFLPSTEDVYDCRVEHWGLDEPLL KHWEFDAPSPLPETTENVVCALGLTVGLVGIIIGTIFIIKGVRKSNAAERR GPL |

EXPERIMENTAL EXAMPLES

Example 1: Identifying a Suitable Umbilical Cord Containing MSC, Assessing and Selecting a MSC Population Obtained from the Umbilical Cord for Generating a Pharmaceutical Composition Suitable for Wound Healing MSCs were derived from fresh umbilical cord tissue collected at the University of Colorado Hospital.
Stage 1: Tissue Bank In a first step, umbilical cords are collected, usually after the Institutional Review Board (IRB) consent is obtained from the tissue donor. Fresh collected umbilical cord is cut into 1 to 2 mm$^3$ sections, controlled-rate frozen in vials containing 4 to 5 segments and stored in quarantine in liquid nitrogen (LN$_2$) vapor phase at −196° C. (cf. FIG. 1). Maternal blood samples, collected within seven days of delivery, are screened for infectious diseases and the tissues are tested for microbial contamination. The in-process release criteria for Stage 1 include infectious disease negative for all tests except CMV, sterility negative, and maternal questionnaire acceptable. Although the umbilical cords are naturally contaminated by vaginal flora during delivery, the collection in antibiotics will render some of them sterile. Up to 100 umbilical cord samples can be collected in such a tissue bank. The sterile tissues will be used in the Stage 2.
Stage 2: Development Cultures Developmental cultures are the outgrowths from the umbilical tissues that are used to produce pure MSC lines. 10 tissue segments are placed individually in 6-well plates and propagated for approximately 10-20 days to generate Passage 0 (P0) cells. P0 cells are seeded in 175 cm$^2$ flask and cultivated to obtain Passage 1 (P1) cells. P1 cells are frozen at 1-3×10$^6$ cells/vial in CryoStor 5 or seeded for culture. Passage 1 cells are seeded at 2-3×10$^5$ cells/175 cm$^2$ flask. During propagation, the cell morphology is recorded. Cells from Passage 2 (P2) are assessed by flow cytometry for MSC markers, and supernatants are assessed for cytokine production. In more detail, P2 cells are subjected to a multiplex analysis (R&D Systems/Bio-techne cat. #LXSAHM) with the following analytes Ang-1, VEGF, HGF and a singleplex assay was carried out with TGF-β. The assays have been carried out as follows:

Multiplex Assay:
(i) A standard was prepared by combining 100 µl of each standard into a single microcentrifuge tube which already contained the appropriate volume of complete PTT6 medium to make up the total volume to 1000 µl. Standard S1 contained all the multiplex standards combined together in a single vial. To make a 3-fold serial dilution of S 1, 200 µl of complete PTT6 medium were pipetted into each of five 1.5 ml polypropylene tubes labeled S2-S6. Then, 100 µl were transferred from S1 to S2. After vortexing, 100 µl were transferred from S2 to S3. The procedure was continued up to S6. PTT6 complete medium served as the Blank.
(ii) Beads were prepared by gently vortexing the vial to re-suspend. It was important to be careful not to invert the vial. If the whole plate was used, 500 µl beads were combined with 5.0 ml Diluent RD2-1. If fewer wells were used, the volumes were adjusted accordingly. The vial or wells were protected from light.
(iii) If necessary: sample preparation. All samples were used undiluted unless the sample concentration exceeded the highest standard value (S1). In such a case, the assay was repeated with an appropriately diluted sample. For the dilution PTT6 was used. All samples were measured in triplicates.
(iv) The beads were gently vortexed before 50 µl were added to each well using a multi-channel pipet and a reservoir.
(v) 50 µl of standard or sample were added per well. Then, the plate was covered with plate sealer and incubated protected from light for 2 h at room temperature (RT) on an orbital shaker at 800 rpm.
(vi) During sample incubation, the Biotin Antibody Cocktail was prepared by gently vortexing the vial to re-suspend. It was important to be careful not to invert the vial. Then 500 µl Biotin Antibody Cocktail was combined with 5.0 ml Diluent RD2-1. The solution was mixed thoroughly.
(vii) Streptavidin phycoerythrin (PE) was prepared by gently vortexing the vial to re-suspend (carefully not to invert the vial). Then, 200 µl Streptavidin-PE concentrate was combined with 5.35 ml Wash Buffer. The solution was mixed thoroughly and protected from light.
(Viii) The plate was washed as follows: The plate was attached to the magnet and let sit for at least a minute.

While the plate was attached to the magnet, the plate was quickly inverted to decant the plate into the sink followed by a relatively forceful downward motion (1-2 times) to empty the wells. Complete removal of liquid by inversion was essential, but did not blot the plate. The magnet was detached and the wells were filled with 100 µl Wash Buffer using a multi-channel pipette. Afterwards, the magnet was re-attached and let sit for a minute before the decanting was performed as described before. The washing was repeated for a total number of 3 washed.
(ix) 50 µl diluted Biotin Antibody were added to each well using a multi-channel pipette. The plate was covered and incubated for 1 h at RT on shaker set at 800 rpm. Afterwards, the plate was washed 3 times as before.
(x) 50 µl diluted Streptavidin-PE were added to each well. The plate was covered and incubated for 30 min at RT on shaker as before. Afterwards, the plate was washed 3 times as before.
(xi) 100 µl Wash Buffer were added to each well and the plate was incubated for 2 min at RT on shaker as before. Then, the well contents were immediately transferred into a Costar 6509 96-well4 plate using a multi-channel pipette set to 120 µl. The plate was then placed into the fitting mold in the Luminex 3D scanner.
(xii) The plate was read and analyzed using Luminex 3D and Xponent software.

TGF-β1 Singleplex:
(i) A standard was prepared by using 1.5 ml polypropylene tubes to make dilutions. For this purpose, 500 µl Standard S1 was pipetted into a S1 tube. To tubes S2-S6, 200 µl of complete PTT6 medium were added. By transferring 100 µl serially from one S1 up to S7 and ensuring a thoroughly mixing, the standard was diluted 1:3.
(ii) Beads were prepared by gently vortexing the vial to re-suspend. It was important to be careful not to invert the vial. If the whole plate was used, 50 µl beads were combined with 5.0 ml Microparticle Diluent RD2-1. If fewer wells were used, the volumes were adjusted accordingly. The vial or wells were protected from light.
(iii) To make TGF-β1 immunoreactive (samples only, not the standard), 30 µl of Activation Reagent was added to 150 µl supernatant. The solution was mixed thoroughly and incubated for 10 min at RT. All samples were used undiluted unless the sample concentration exceeded the highest standard value (S1). In such a case, the assay was repeated with an appropriately diluted sample. For the dilution PTT6 was used. All samples were measured in triplicates.
(iv) The beads were gently vortexed before 50 µl were added to each well using a multi-channel pipet and a reservoir.
(v) 50 µl of standard or sample were added per well. Then, the plate was covered with plate sealer and incubated protected from light for 2 h at RT on an orbital shaker at 800 rpm.
(vi) During sample incubation, the Biotin Antibody Cocktail was prepared by gently vortexing the vial to re-suspend. It was important to be careful not to invert the vial. Then 50 µl Biotin Antibody Concentrate was combined with 5.0 ml Biotin Antibody Diluent. The solution was mixed thoroughly.
(vii) Streptavidin phycoerythrin (PE) was prepared by gently vortexing the vial to re-suspend (carefully not to invert the vial). Then, 55 µl 100× Streptavidin-PE concentrate was combined with 5.35 ml Wash Buffer. The solution was mixed thoroughly and protected from light.
(Viii) The plate was washed as follows: The plate was attached to the magnet and let sit for at least a minute. While the plate was attached to the magnet, the plate was quickly inverted to decant the plate into the sink followed by a relatively forceful downward motion (1-2 times) to empty the wells. Complete removal of liquid by inversion was essential, but did not blot the plate. The magnet was detached and the wells were filled with 100 µl Wash Buffer using a multi-channel pipette. Afterwards, the magnet was re-attached and let sit for a minute before the decanting was performed as described before. The washing was repeated for a total number of 3 washed.
(ix) 50 µl diluted Biotin Antibody were added to each well using a multi-channel pipette. The plate was covered and incubated for 1 h at RT on shaker set at 800 rpm. Afterwards, the plate was washed 3 times as before.
(x) 50 µl diluted Streptavidin-PE were added to each well. The plate was covered and incubated for 30 min at RT on shaker as before. Afterwards, the plate was washed 3 times as before.
(xi) 100 µl Wash Buffer were added to each well and the plate was incubated for 2 min at RT on shaker as before. Then, the well contents were immediately transferred into a Costar 6509 96-well4 plate using a multi-channel pipette set to 120 µl. The plate was then placed into the fitting mold in the Luminex 3D scanner.
(xii) The plate was read and analyzed using Luminex 3D and Xponent software.

Stage 3: Master Cell Bank 3 cell lines that meet the Stage 2 in-process release criteria are then seeded into the Terumo Quantum bioreactor at $20\text{-}40\times10^6$ viable cells and propagated for approximately 7-14 days. Post-Quantum cells are tested for sterility, endotoxin, mycoplasma, human pathogen virus and adventitious virus testing. The cells are cryopreserved at 9 to $10\times10^6$ cells/vial (50-70 vials per batch). The MSC are propagated in flasks and in the Terumo Quantum in culture medium PTT6, formulated as follows for 1000 ml (500 ml of PTT6 basal medium, 236 ml of M171, 236 ml of DMEM F12, 25 ml of fetal bovine serum, 0.1 ml of 0.1 mg/ml epidermal growth factor [10 ng/ml final concentration]), 0.35 ml of insulin (5 µg/ml final concentration) and incubated at 37° C. in 5% $CO_2$.

Stage 4: Therapeutic Cultures

1×, 3× and $5\times10^6$ MSCs that were positively tested for Ang-1, TGF-β, VEGF and HGF were bottled in Hypothermosol® and stored at 2-8° C. before pharmaceutical administration.

Example 2: Protein Secretion Level Analysis for Identifying Suitable Donor Cords For analysis, 10 umbilical cords were collected from different donors. These umbilical cords were used to produce 10 individual MSC populations derived from the amniotic membrane of the umbilical cord.

The aim of the experiment was to determine the secretion level of Ang-1, VEGF, HGF and TGF-β1 to draw back a conclusion about variabilities in the secretion profile of individual MSC populations and to identify a MSC population with sufficient secretion of Ang-1, VEGF, HGF and TGF-β1.

Therefore, the individual MSC populations were cultivated according to the present invention and post-stage 2 the secretion level of Ang-1, VEGF, HGF and TGF-β (here TGF-β1) was determined for each the MSC population as described in Example 1. The results of the secretion level analysis are shown in FIG. 2, wherein the protein specific threshold (500 pg/ml for Ang-1 and TGF-β, respectively, and 100 pg/ml for VEGF and HGF, respectively) was indicated by a horizontal, black line.

As can be seen from in the result, the secretion level of TGF-β1 is more than twice as high as the threshold value in all 10 individual MSC populations. Thus, the threshold value of 500 pg/ml for TGF-β1 was exceeded for all individual MSC populations. The plotted secretion levels of HGF show that 5 out of 10 samples exceed the threshold value of 100 pg/ml, namely MSC population 8049365 exhibiting a secretion level of about 600 pg/ml, MSC population 8049369 exhibiting a secretion level of about 300 pg/ml, MSC population 8049372 exhibiting a secretion level of about 1450 pg/ml, MSC population 8049373 exhibiting a secretion level of about 380 pg/ml and MSC population 8049384 exhibiting a secretion level of about 190 pg/ml. The plotted secretion levels Ang-1 show that all individual MSC populations exceeded the threshold value of 500 pg/ml. The secretion levels of VEGF show that the threshold value of 100 pg/ml was exceeded for all samples except 8049358, 8049359 and 8049370. In this context, the secretion level of 8049359 was only about 50 pg/ml, whereas the levels of 8049358 and 8049359 are close to zero.

The results show that the protein secretion level of the different individual MSC populations varies, confirming that MSCs have individual secretion profiles. In order to identify a MSC population with sufficient secretion of Ang-1, VEGF, HGF and TGF-β1, the secretion level of these proteins was analyzed.

In this context, MSC exhibit sufficient secretion of Ang-1, TGF-β, VEGF and HGF if the levels of these proteins exceed their respective threshold value. Accordingly, MSC population 8049365, 8049369, 8049372, 8049373 and 8049384 (each of which is obtained from a different donor umbilical cord) exhibit sufficient Ang-1, TGF-β, VEGF and HGF secretion since these are the only MSC populations that exceed the given thresholds value for each of the four chosen proteins. For the subsequent experiments (setting up a master cell bank and production of cells for pharmaceutical purposes, the MSC population 8049372 was chosen herein.

Example 3: Analysis of Secretion Level Stability

Figures 3A, 3B:
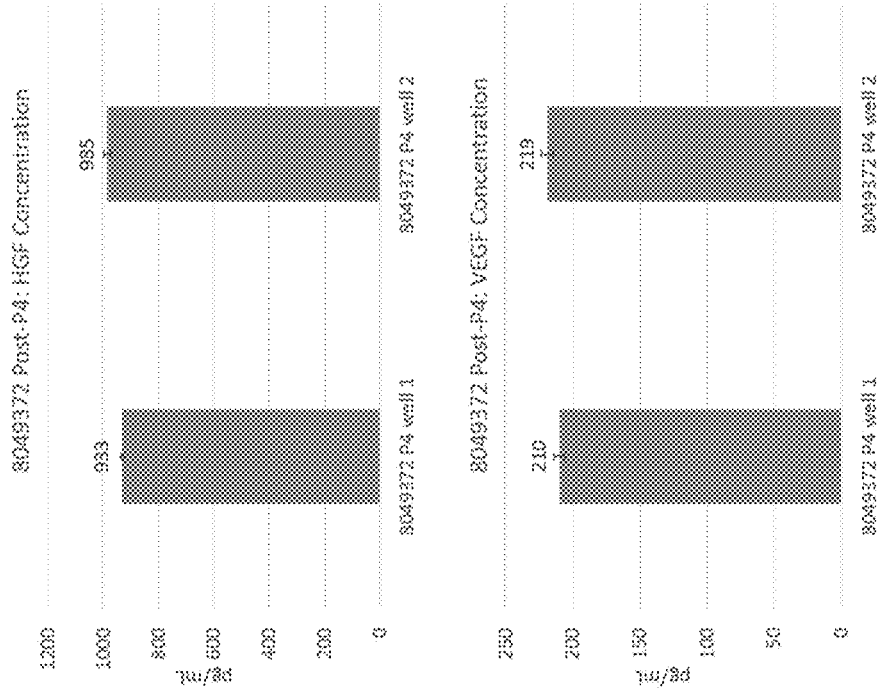
FIGS. 3A-3D show the assessment of cytokine secretion stability in a MSC population (8049372). For this purpose, the secretion level of TGF-β, HGF, Ang-1 and VEGF is each determined and compared in two separate samples of the same population post-stage 4.
Figures 3C, 3D:
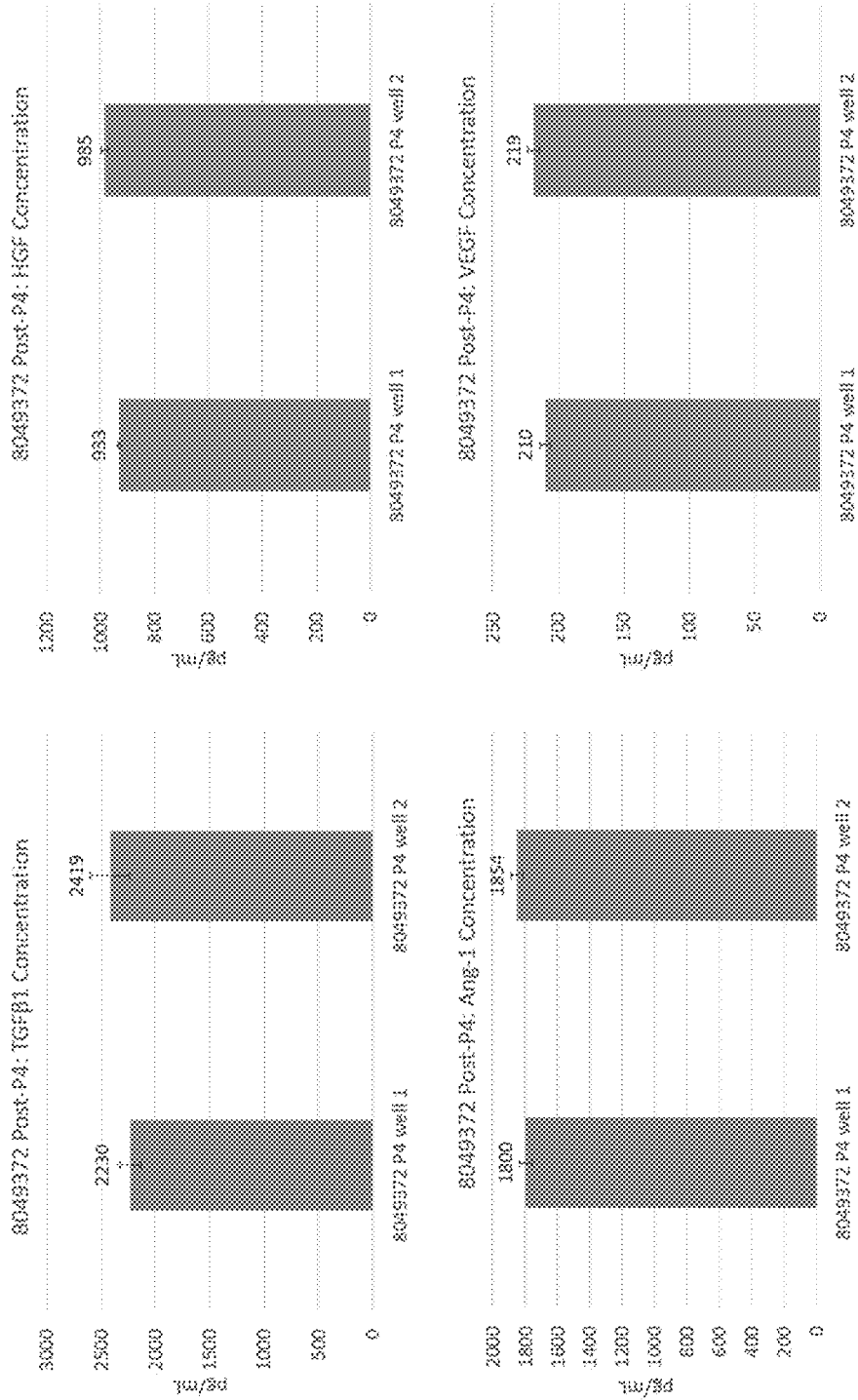

MSC population 8049372 showing sufficient secretion of the proteins Ang-1, TGF-β, VEGF and HGF in Example 2 was used to analyze the stability of the protein secretion level. Therefore, the MSC population was further cultivated until the the cells were passaged a fourth time. Then, two samples of the MSC population post-stage 4 (MSC of well 1 and MSC of well 2) were analyzed regarding the secretion level of Ang-1, VEGF, HGF and TGF-β (here TGF-β1) as described in Example 1. The protein secretion levels of the MSC population 8049372 determined in this experiment (post-stage 4) is then compared to the secretion levels of the MSC population 8049372 determined in Example 2 (potsstage 2). This way, changes in the secretion levels within different time points can be revealed. Thereby, conclusions can be drawn about the stability of the protein secretion level and thus about the sufficiency of the protein secretion over time. The results are shown in FIG. 3.

Post-stage 2, MSC population 8049372 exhibited a secretion level of about 2200 pg/ml for TGF-β1. After passaging the cells two more times, the post-stage 4 MSC population 8049372 exhibits in average about 2345 pg/ml TGF-β1. Thus, the secretion level of MSC population 8049372 increased about 7% after passaging the cells two more times. The secretion level of HGF decreased about 33% after passaging the cells two more times from about 1450 pg/ml post-stage 2 to about 959 pg/ml in average post-stage 4. The post-stage 4 MSC population 8049372 exhibits in average about 1827 pg/ml Ang-1, which is a decrease of about 9% regarding the 2000 pg/ml Ang-1 post-stage 2. The secretion level of VEGF increased about 43% after passaging the cells two more times from about 150 pg/ml post-stage 2 to about 215 pg/ml in average post-stage 4.

The results show, that the secretion level of the proteins Ang-1, VEGF, HGF and TGF-β (here TGF-β1) also varies after passaging the cells two more times. However, the respective thresholds values as chosen herein were still exceeded for all of the analyzed proteins after passaging the cells two more times. Consequently, the results of this experiment indicate that MSC population 8049372 maintained a relative protein secretion stability and thus its wound healing potency. Therefore, this results show that the wound healing potency of a MSC population may be stable for a certain period. Based on this result, the MSC population 8049372 is a suitable candidate as starting material for generating a master cell bank or for the production of a pharmaceutical composition for subsequent administration to a subject.

Example 4: Identification of a Medium for Suitable for Inducing or Improving Wound Healing Properties of a Mesenchymal Stem Cell For this experiment, various isolated MSC populations of the amniotic membrane of umbilical cord were cultivated in PTT4, PTT6 or DMEM/F12 as described in International Application WO 2018/067071 and subsequently analyzed with respect to the secretion of wound healing marker proteins for comparison.

Culture Protocol for Cultivation of the Isolated MSCs
  5 million MSCs were plated in 100 mm tissue culture dishes in DMEM/F12/10%FCS for 24 h.
  Medium was discarded and PTT4, PTT6/DMEM/F12 was added to culture for 24 h.
  Medium was discarded and cells were washed with PBS. 10 ml DMEM were added to culture for 24 h.
  Medium was discarded and 5 ml DMEM were added to culture.
  After 24 h cultivation, conditioned media were harvested, centrifuged to remove cell debris, supernatant aliquoted into tubes for storage at −80° C. and subsequent analysis of marker protein secretion by cytokine assays Secretion level analysis on PTT4, PTT6 vs. DMEM/F12 Media Supernatants Secretion level analysis was performed in MSC supernatants. Measurements and analysis has been conducted using Luminex 200 and Xponent software.

Each sample was tested in triplicate except the samples of supernatant of placental The aim of this experiment was to generate cytokine profiles of MSCs cultivated either in PTT4 or PTT6 and to compare the profiles of MSCs from different tissue origins (umbilical cord lining vs. Wharton's Jelly vs. placental MSC). The cytokine measurements were carried as described below. The profile will shed light onto which stem cell population grown in which medium would secrete more of the cytokines of interest, meaning which medium is suitable for inducing or promoting wound healing properties of the MSCs.

Multiplex Analysis

Multiplex Information:

R&D Systems/Bio-techne cat. #LXSAHM. This kit is lot #L123680, expires Aug. 28, 2018, with the following analytes:

Ang-1, angiopoietin

VEGF, vascular endothelial growth factor

HGF, hepatocyte growth factor

TGFβ1 Singleplex Information: R&D Systems/Bio-techne:

Base kit, cat. #LTGM00, lot #P156217, received Feb. 27, 2018, expires Aug. 30, 2018.

TGFβ1 component, cat. #LTGM100, lot #P161760, received Feb. 27, 2018, expires Nov. 27, 2019.

Multiplex Information:

R&D Systems/Bio-techne cat. #LXSAHM. This kit is lot #L123999, expires Sep. 25, 2018, with the following analytes:

Ang-1, angiopoietin

VEGF, vascular endothelial growth factor

HGF, hepatocyte growth factor

Data Entry

Raw data output is in PDF and Excel formats. Data in Excel format are used to process the data.

Procedure

Protein detection in MSC supernatants was carried out in accordance with the detailed protocol information. As part of this experiment, the protocol has a single amendment: Std. 8 in the Multiplex kit is no longer used. The reason for discontinuing Std. 8 is because R&D Systems protocol itself uses only Standards 1 through 6. Furthermore, Std. 8 was validated for only two of the six analytes that comprise the Multiplex: HGF. In the case of HGF, that analyte falls in the mid-region of the standard curve. Since the Standards are reconstituted using growth media, standard curves were constructed with both PTT4 and PTT6. Test samples grown in either PTT4 or PTT6 were extrapolated from respective standard curves. The results were extrapolated by the Luminex software from the analyte-specific standard curve that is generated by the same software: the analysis algorithm is set to Logistic 5P Weighted with weighted analysis, using 1/y2 for weighting.

Samples

1. DMEM/F12 and PTT6 and PTT4 media (not exposed to MSCs)
2. Supernatants of MSC's to be tested
3. Optional: supernatants from different donors; CR001A, C, D, and G.

Figure 4A:
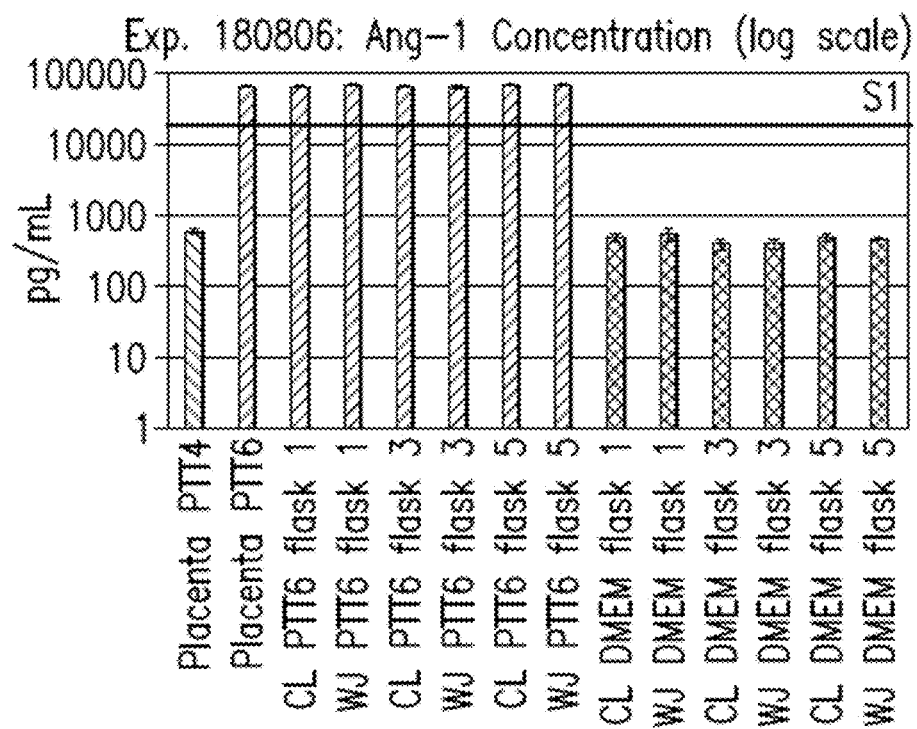
FIGS. 4A-4D show the results of assays for identifying a medium suitable for inducing or improving wound healing properties of a mesenchymal stem cell population. MSCs obtained from the placenta, the Wharton's Jelly (WJ-MSC) and the amniotic membrane of the umbilical cord, also referred to as cord lining MSC (CL-MSC), were cultivated in different media suitable for cultivating MSCs (PTT4, PTT6 and DMEM/F12). The protein detection was performed in MSC supernatants and the analysis has been conducted using Luminex 200 and Xponent software.
Figure 4B:
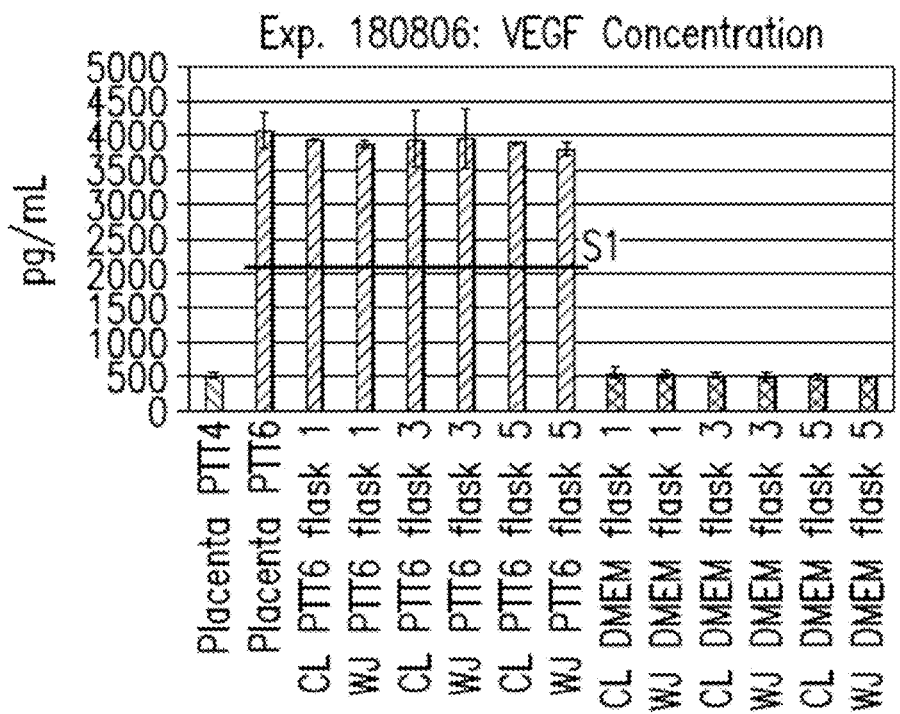
Figure 4C:
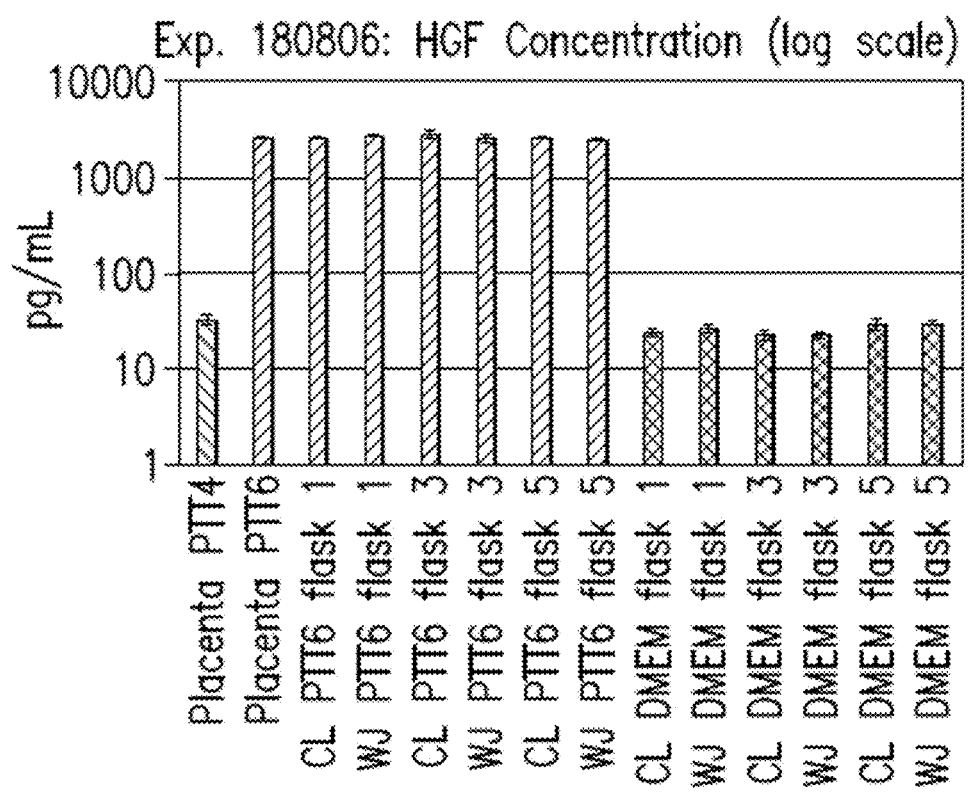
Figure 4D:
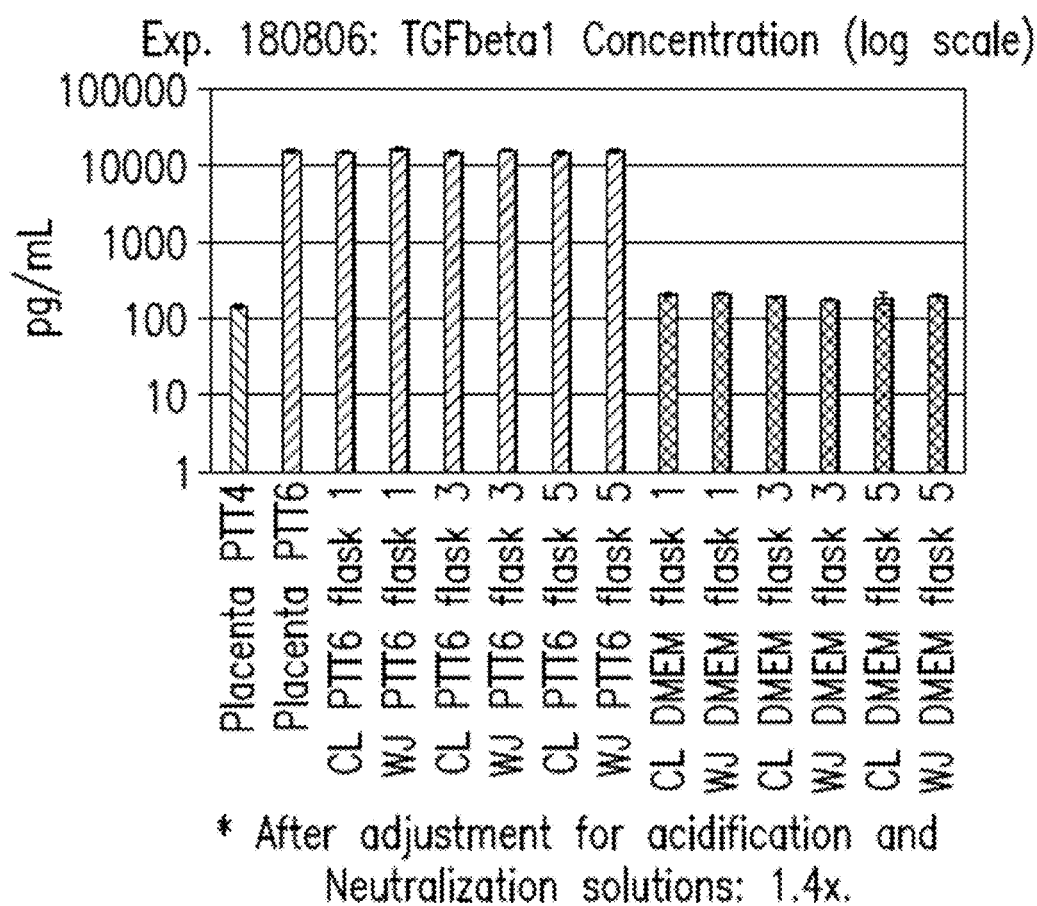

The results for Ang-1 are shown in FIG. 4A and show that MSC of the amniotic membrane of the umbilical cord produce more Ang-1 when grown in PTT6 than when grown in DMEM/F12 or PTT4. The results for VEGF are shown in FIG. 4B and show that MSC of the amniotic membrane of the umbilical cord produce more VEGF when grown in PTT6 than when grown in DMEM/F12 or PTT4. The results for HGF are shown in FIG. 4C and show that MSC of the amniotic membrane of the umbilical cord produce more HGF when grown in PTT6 than when grown in DMEM/F12 or PTT4. Finally, the results for TGF-β1 are shown in FIG. 4D and show that MSC of the amniotic membrane of the umbilical cord produce more TGF-β1 when grown in PTT6 than when grown in DMEM/F12 or PTT4.

From the above described experiments the following can be concluded. When MSCs are cultivated in PTT6 medium, the secretion of Ang-1, TGF-β1, VEGF, and HGF by the MSC population is significantly increased compared to their secretion level in PTT4 or a commercially available culture medium such as DMEM/F12. PTT6 medium has the highest ability to induce or improve wound healing properties of a MSC population by promoting the secretion of all of Ang-1, TGF-β1, VEGF, and HGF (the involvement of which in wound healing is known, as discussed herein) in MSC populations Therefore, determining the secretion level of Ang-1, TGF-β1, VEGF, and HGF can be used to identify a medium suitable for inducing or improving wound healing properties of a mesenchymal stem cell population.

It will be readily apparent to a person skilled in the art that varying substitutions and modifications may be made to the invention disclosed herein without departing from the scope and spirit of the invention.

All patents and publications mentioned in the specification are indicative of the levels of those of ordinary skill in the art to which the invention pertains. All patents and publications are herein incorporated by reference to the same extent as if each individual publication was specifically and individually indicated to be incorporated by reference.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention. The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein. In addition, where features or aspects of the invention are described in terms of Markush groups, those skilled in the art will recognize that the invention is also thereby described in terms of any individual member or subgroup of members of the Markush group. Further embodiments of the invention will become apparent from the following claims.

The invention is further characterized by the following items:

1. A method of assessing the wound healing potency of a mesenchymal stem cell population, wherein the method comprises determining in a medium the level of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) secreted into the medium by the mesenchymal stem cell population.
2. A method of identifying a tissue suitable as starting material for producing a mesenchymal stem cell population for pharmaceutical use, wherein the method comprises determining in a medium the level of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) secreted into the medium by a sample of the tissue or a cell isolated from the tissue.

3. A method of selecting a mesenchymal stem cell population for producing a stem cell population under cGMP conditions, wherein the method comprises determining in a medium the level of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) secreted into the medium by the mesenchymal stem cell population.

4. A method of selecting a mesenchymal stem cell population for producing a stem cell population for subsequent pharmaceutical administration, wherein the method comprises determining in a medium the level of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) secreted into the medium by the mesenchymal stem cell population.

5. A method of selecting a mesenchymal stem cell population for generating a master cell bank, wherein the method comprises determining in a medium the level of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) secreted into the medium by the mesenchymal stem cell population.

6. The method of any one of the items 1 to 5, wherein the method comprises determining in the medium the level of at least two, at least three or all four proteins selected from the group consisting of Angiopoietin 1 (Ang-1), Transforming Growth Factor beta (TGF-β), Vascular Endothelial Growth Factor (VEGF) and Hepatocyte Growth Factor (HGF) secreted into the medium by the mesenchymal stem cell population.

7. The method of any one of the items 1 to 6, wherein a secretion level equaling or exceeding a threshold value indicates
(i) potency for wound healing of the mesenchymal stem cell population; or
(ii) a tissue or an isolated cell suitable as starting material for producing a mesenchymal stem cell population.

8. The method of item 7, wherein for Angiopoietin 1 (Ang-1) the threshold value is about 400 pg/ml or about 500 pg/ml.

9. The method of items 7 or 8, wherein for Transforming Growth Factor beta (TGF-β) the threshold value is about 400 pg/ml or about 500 pg/ml.

10. The method of any one of the items 7 to 9, wherein for Vascular Endothelial Growth Factor (VEGF) the threshold value is about 80 mg/ml or about 100 pg/ml.

11. The method of any one of the items 7 to 10, wherein for Hepatocyte Growth Factor (HGF) the threshold value is about 80 pg/ml or about 100 pg/ml.

12. The method of any of items 8 to 11, wherein the secretion level of all four proteins equal or exceed their respective threshold value, and wherein the threshold value is
a threshold value of about 400 pg/ml for Angiopoietin 1 (Ang-1),
a threshold value of about 400 pg/ml for Transforming Growth Factor beta (TGF-β),
a threshold value of about 80 pg/ml for Vascular Endothelial Growth Factor (VEGF), and
a threshold value of about 80 pg/ml for Hepatocyte Growth Factor (HGF).

13. The method of any of items 8 to 11, wherein the secretion level of all four proteins equal or exceed their respective threshold value, and wherein the threshold value is
a threshold value of about 500 pg/ml for Angiopoietin 1 (Ang-1),
a threshold value of about 500 pg/ml for Transforming Growth Factor beta (TGF-β),
a threshold value of about 100 pg/ml for Vascular Endothelial Growth Factor (VEGF), and
a threshold value of about 100 pg/ml for Hepatocyte Growth Factor (HGF).

14. The method of any one of the items 1 to 13, wherein the mesenchymal stem cell population is selected from the group consisting of a mesenchymal stem cell population of the umbilical cord, a placental mesenchymal stem cell population, a mesenchymal stem cell population of the cord-placenta junction, a mesenchymal stem cell population of the cord blood, a mesenchymal stem cell population of the bone marrow, and an adipose-tissue derived mesenchymal stem cell population.

15. The method of item 14, wherein the mesenchymal stem cell population of the umbilical cord is selected from the group consisting of a mesenchymal stem cell population of the amnion (AM), a perivascular (PV) mesenchymal stem cell population, a mesenchymal stem cell population of Wharton's jelly (WJ), a mesenchymal stem cell population of the amniotic membrane of umbilical cord and a mixed mesenchymal stem cell population of the umbilical cord (MC).

16. The method of item 2, wherein the tissue is an umbilical cord or the amniotic membrane of the umbilical cord and the mesenchymal stem cell population is a stem cell population of the amniotic membrane of umbilical cord.

17. The method of items 15 or 16, wherein the mesenchymal stem cell population of the amniotic membrane of the umbilical cord is a mesenchymal stem cell population, wherein at least about 90% or more cells of the stem cell population express each of the following markers: CD73, CD90 and CD105.

18. The method of item 17, wherein at least about 90% or more cells of the mesenchymal stem cell population lack expression of the following markers: CD34, CD45 and HLA-DR.

19. The method of items 17 or 18, wherein at least about 91% or more, about 92% or more, about 93% or more, about 94% or more, about 95% or more, about 96% or more, about 97% or more, about 98% or more about 99% or more cells of the mesenchymal stem cell population express each of CD73, CD90 and CD105 and lack expression of each of CD34, CD45 and HLA-DR.

20. The method of any of the foregoing items, wherein the medium is a cell culture medium or a storage medium.

21. The method of item 20, wherein the storage medium is Hypothermosol or Plasmalyte.

22. The method of any one of the items 1 to 19, wherein the medium comprises Dulbecco's Modified Eagle's Medium (DMEM) in a final concentration of about 55 to 65% (v/v), Ham's F12 Medium (F12) in a final concentration of about 5 to 15% (v/v), a serum free basal medium in a final concentration of about 15 to 30% (v/v) and Fetal Bovine Serum (FBS) in a final concentration of about 1 to 8% (v/v).

23. The method of item 22, wherein the medium comprises Dulbecco's Modified Eagle's Medium (DMEM) in a final concentration of about 57.5 to 62.5% (v/v), Ham's F12 Medium (F12) in a final concentration of about 7.5 to 12.5% (v/v), a serum free basal medium in a final concentration of about 17.5 to 25.0% (v/v) and Fetal Bovine Serum (FBS) in a final concentration of about 1.75 to 3.5% (v/v).

24. The method of item 23, wherein the medium comprises Dulbecco's Modified Eagle's Medium (DMEM) in a final concentration of about 61.8% (v/v), Ham's F12 Medium (F12) in a final concentration of about 11.8% (v/v), a serum free basal medium in a final concentration of about 23.6% (v/v) and Fetal Bovine Serum (FBS) in a final concentration of about 2.5% (v/v).

25. The method of items 23 or 24, wherein the serum free basal medium is M171.

26. The method of any of items 22 to 25, wherein the medium further comprises Epidermal Growth Factor (EGF) in a final concentration of about 1 ng/ml to about 20 ng/ml.

27. The method of item 26, wherein the medium comprises Epidermal Growth Factor (EGF) in a final concentration of about 10 ng/ml.

28. The method of any of items 22 to 27, wherein the medium comprises Insulin in a final concentration of about 1 µg/ml to 10 µg/ml.

29. The method of item 28, wherein the medium comprises Insulin in a final concentration of about 5 µg/ml.

30. The method of any of items 22 to 29, wherein the medium further comprises at least one of the following supplements: adenine, hydrocortisone, and 3,3',5-Triiodo-L-thyronine sodium salt (T3).

31. The method of any of items 22 to 30, wherein the medium comprises all three of adenine, hydrocortisone, and 3,3',5-Triiodo-L-thyronine sodium salt (T3).

32. The method of item 30 or 31, wherein the medium comprises adenine in a final concentration of about 0.01 to about 0.1 µg/ml adenine, hydrocortisone in a final concentration of about 0.1 to about 10 µg/ml hydrocortisone and/or 3,3',5-Triiodo-L-thyronine sodium salt (T3) in a final concentration of about 0.5 to about 5 ng/ml.

33. The method of any of items 1 to 32, wherein cultivating the mesenchymal stem cell population in the medium as defined in any of the foregoing items 22 to 32 results in an increase of the expression and/or secretion of at least one of the proteins selected from a group consisting of Angiopoietin 1 (Ang-1), Transforming Growth Factor beta (TGF-β; in particular TGF-β1), Vascular Endothelial Growth Factor (VEGF) and Hepatocyte Growth Factor (HGF) by the mesenchymal stem cell population relative to a reference medium that does not comprise all of DMEM (Dulbecco's modified eagle medium), F12 (Ham's F12 Medium), M171 (Medium 171) and FBS (Fetal Bovine Serum).

34. The method of any one of the items 1 to 33, wherein the cell medium is subjected to centrifugation after a suitable period of cultivation.

35. The method of item 34, wherein the suitable period of cultivation comprises about 12 h, about 24 h, about 36 h, about 46 h, about 48 h or about 50 h, preferably about 48 h.

36. The method of items 34 or 35, wherein the supernatant of the centrifuged cell culture medium is subjected to a multiplex assay.

37. The method of item 36, wherein the multiplex assay is bead-based.

38. Use of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) for assessing the wound healing potency of a mesenchymal stem cell population.

39. Use of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) for selecting a mesenchymal stem cell population for producing a stem cell population under cGMP conditions.

40. Use of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) for selecting a mesenchymal stem cell population for producing a stem cell population for subsequent pharmaceutical administration.

41. Use of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) for selecting a mesenchymal stem cell population for generating a master cell bank.

42. Use of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) for identifying a tissue suitable as starting material for producing a mesenchymal stem cell population for pharmaceutical use.

43. The use of item 42, wherein the tissue is an umbilical cord or the amniotic membrane of the umbilical cord and the mesenchymal stem cell population is a stem cell population of the amniotic membrane of umbilical cord.

44. The use of any of items 38 to 41, wherein the use comprises determining in the cell culture medium the level of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) secreted into the cell culture medium by the mesenchymal stem cell population.

45. The use of item 42 or 43, wherein the use comprises determining in the cell culture medium the level of at least one protein selected from the group consisting of Angiopoietin 1 (Ang 1), Transforming Growth Factor beta (TGF β), Vascular Endothelial Growth Factor (VEGF) and Hepatocyte Growth Factor (HGF) secreted into the cell culture by a sample of the tissue or a cell isolated from the tissue.

46. The use of any of items 38 to 44 wherein the use comprises determining in the cell culture medium the level of at least two, at least three or all four proteins selected from the group consisting of Angiopoietin 1 (Ang-1), Transforming Growth Factor beta (TGF-β), Vascular Endothelial Growth Factor (VEGF) and Hepatocyte Growth Factor (HGF) secreted into the cell culture medium by the mesenchymal stem cell population.

47. A method of identifying a medium suitable for inducing or improving wound healing properties of a mesenchymal stem cell population, wherein the method comprises determining the level of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) secreted into the medium by the mesenchymal stem cell population.

48. Use of at least one protein selected from the group consisting of Angiopoietin 1 (Ang-1), Transforming Growth Factor beta (TGF-β), Vascular Endothelial Growth Factor (VEGF) and Hepatocyte Growth Factor (HGF) for identifying a medium suitable for inducing or improving wound healing properties of a mesenchymal stem cell population.

49. The use of item 48, wherein the use comprises determining in the medium the level of at least two, at least three or all four proteins secreted into the medium by the mesenchymal stem cell population.

What is claimed is:

1. A method of assessing the wound healing potency of an amniotic membrane mesenchymal stem cell population and selecting a desired mesenchymal stem cell population having effective potency for wound healing, wherein the method comprises:
   (a) cultivating the amniotic membrane mesenchymal stem cell population in vitro in a medium suitable for cultivation of an amniotic membrane mesenchymal stem cell population,
   (b) determining in the medium the secretion level of each of Angiopoietin 1 (Ang-1), Transforming Growth Factor beta (TGF-B), Vascular Endothelial Growth Factor (VEGF) and Hepatocyte Growth Factor (HGF) secreted into the medium by the amniotic membrane mesenchymal stem cell population;
   (c) comparing the determined secretion level of each of Ang 1, TGF β, VEGF, and HGF to a corresponding threshold level, and selecting a mesenchymal stem cell population having a secretion level of each of Ang 1, TGF β, VEGF, and HGF equaling or exceeding its corresponding threshold level to provide the desired mesenchymal stem cell population having effective potency for wound healing, wherein the threshold values are
      a threshold value of at least 400 pg/ml for Angiopoietin 1 (Ang-1),
      a threshold value of at least 400 pg/ml for Transforming Growth Factor beta (TGF-β),
      a threshold value of at least 80 pg/ml for Vascular Endothelial Growth Factor (VEGF); and
      a threshold value of at least 80 pg/ml for Hepatocyte Growth Factor (HGF), and
   (d) placing the selected amniotic membrane mesenchymal stem cell population into
      (i) a cultivation medium selected for cultivation the selected amniotic membrane mesenchymal stem cell population, or
      (ii) a cryoprotectant medium selected for long term storage of the selected amniotic membrane mesenchymal stem cell population, or
      (iii) a preservation medium selected for short term storage of the selected amniotic membrane mesenchymal stem cell population prior to administration to a subject.

2. The method of claim 1, wherein the Angiopoietin 1 (Ang-1) threshold value is 500 pg/ml.

3. The method of claim 1, wherein the Transforming Growth Factor beta (TGF-β) threshold value is 500 pg/ml.

4. The method of claim 1, wherein the Vascular Endothelial Growth Factor (VEGF) threshold value is 100 pg/ml.

5. The method of claim 1, wherein the Hepatocyte Growth Factor (HGF) threshold value is 100 pg/ml.

6. The method of claim 1 wherein the threshold values are
   500 pg/ml for Angiopoietin 1 (Ang-1),
   500 pg/ml for Transforming Growth Factor beta (TGF-β),
   100 pg/ml for Vascular Endothelial Growth Factor (VEGF), and
   100 pg/ml for Hepatocyte Growth Factor (HGF).

7. The method of claim 1, wherein the mesenchymal stem cell population of the amniotic membrane of the umbilical cord of step (a) is a mesenchymal stem cell population, wherein at least 90% or more cells of the stem cell population express each of the following markers: CD73, CD90 and CD105.

8. The method of claim 7, wherein at least 90% or more cells of the mesenchymal stem cell population lack expression of the following markers: CD34, CD45 and HLA-DR.

9. The method of claim 7, wherein at least 91% or more, 92% or more, 93% or more, 94% or more, 95% or more, 96% or more, 97% or more, 98% or more, or 99% or more cells of the mesenchymal stem cell population express each of CD73, CD90 and CD105 and lack expression of each of CD34, CD45 and HLA-DR.

10. The method of claim 1, wherein the medium is a cell culture medium or a storage medium.

11. The method of claim 1, wherein step (d) comprises placing the selected amniotic membrane mesenchymal stem cell population into the cultivation medium and cultivating the desired amniotic membrane mesenchymal stem cell population under Good Manufacturing Practice (GMP) conditions, and producing a cell bank from the cultivated cells.

12. The method of claim 1, wherein step (d) comprises placing the desired amniotic membrane mesenchymal stem cell population into the cryoprotectant medium selected for long term storage of the selected amniotic membrane mesenchymal stem cell population, and
   cryopreserving selected amniotic membrane mesenchymal stem cell population.

13. The method of claim 1, wherein step (d) comprises placing the desired amniotic membrane mesenchymal stem cell population into the preservation medium selected for short term storage of the selected amniotic membrane mesenchymal stem cell population, and
   transporting the selected amniotic membrane mesenchymal stem cell population to an administration site.

* * * * *

SEQUENCE LISTING

```
<160> NUMBER OF SEQ ID NOS: 10

<210> SEQ ID NO 1
<211> LENGTH: 498
<212> TYPE: PRT
<213> ORGANISM: human

<400> SEQUENCE: 1

Met Thr Val Phe Leu Ser Phe Ala Phe Leu Ala Ala Ile Leu Thr His
1               5                   10                  15

Ile Gly Cys Ser Asn Gln Arg Arg Ser Pro Glu Asn Ser Gly Arg Arg
            20                  25                  30

Tyr Asn Arg Ile Gln His Gly Gln Cys Ala Tyr Thr Phe Ile Leu Pro
        35                  40                  45

Glu His Asp Gly Asn Cys Arg Glu Ser Thr Thr Asp Gln Tyr Asn Thr
    50                  55                  60

Asn Ala Leu Gln Arg Asp Ala Pro His Val Glu Pro Asp Phe Ser Ser
65                  70                  75                  80

Gln Lys Leu Gln His Leu Glu His Val Met Glu Asn Tyr Thr Gln Trp
                85                  90                  95

Leu Gln Lys Leu Glu Asn Tyr Ile Val Glu Asn Met Lys Ser Glu Met
            100                 105                 110

Ala Gln Ile Gln Gln Asn Ala Val Gln Asn His Thr Ala Thr Met Leu
        115                 120                 125

Glu Ile Gly Thr Ser Leu Leu Ser Gln Thr Ala Glu Gln Thr Arg Lys
    130                 135                 140

Leu Thr Asp Val Glu Thr Gln Val Leu Asn Gln Thr Ser Arg Leu Glu
145                 150                 155                 160

Ile Gln Leu Leu Glu Asn Ser Leu Ser Thr Tyr Lys Leu Glu Lys Gln
                165                 170                 175

Leu Leu Gln Gln Thr Asn Glu Ile Leu Lys Ile His Glu Lys Asn Ser
            180                 185                 190

Leu Leu Glu His Lys Ile Leu Glu Met Glu Gly Lys His Lys Glu Glu
        195                 200                 205

Leu Asp Thr Leu Lys Glu Glu Lys Glu Asn Leu Gln Gly Leu Val Thr
    210                 215                 220

Arg Gln Thr Tyr Ile Ile Gln Glu Leu Glu Lys Gln Leu Asn Arg Ala
225                 230                 235                 240

Thr Thr Asn Asn Ser Val Leu Gln Lys Gln Gln Leu Glu Leu Met Asp
                245                 250                 255

Thr Val His Asn Leu Val Asn Leu Cys Thr Lys Glu Gly Val Leu Leu
            260                 265                 270
```

```
Lys Gly Gly Lys Arg Glu Glu Lys Pro Phe Arg Asp Cys Ala Asp
            275                 280                 285

Val Tyr Gln Ala Gly Phe Asn Lys Ser Gly Ile Tyr Thr Ile Tyr Ile
290                 295                 300

Asn Asn Met Pro Glu Pro Lys Lys Val Phe Cys Asn Met Asp Val Asn
305                 310                 315                 320

Gly Gly Gly Trp Thr Val Ile Gln His Arg Glu Asp Gly Ser Leu Asp
                325                 330                 335

Phe Gln Arg Gly Trp Lys Glu Tyr Lys Met Gly Phe Gly Asn Pro Ser
                340                 345                 350

Gly Glu Tyr Trp Leu Gly Asn Glu Phe Ile Phe Ala Ile Thr Ser Gln
            355                 360                 365

Arg Gln Tyr Met Leu Arg Ile Glu Leu Met Asp Trp Glu Gly Asn Arg
370                 375                 380

Ala Tyr Ser Gln Tyr Asp Arg Phe His Ile Gly Asn Glu Lys Gln Asn
385                 390                 395                 400

Tyr Arg Leu Tyr Leu Lys Gly His Thr Gly Thr Ala Gly Lys Gln Ser
                405                 410                 415

Ser Leu Ile Leu His Gly Ala Asp Phe Ser Thr Lys Asp Ala Asp Asn
            420                 425                 430

Asp Asn Cys Met Cys Lys Cys Ala Leu Met Leu Thr Gly Gly Trp Trp
            435                 440                 445

Phe Asp Ala Cys Gly Pro Ser Asn Leu Asn Gly Met Phe Tyr Thr Ala
450                 455                 460

Gly Gln Asn His Gly Lys Leu Asn Gly Ile Lys Trp His Tyr Phe Lys
465                 470                 475                 480

Gly Pro Ser Tyr Ser Leu Arg Ser Thr Thr Met Met Ile Arg Pro Leu
                485                 490                 495

Asp Phe

<210> SEQ ID NO 2
<211> LENGTH: 503
<212> TYPE: PRT
<213> ORGANISM: human

<400> SEQUENCE: 2

Met Glu Ala Ala Val Ala Ala Pro Arg Pro Arg Leu Leu Leu Leu Val
1               5                   10                  15

Leu Ala Ala Ala Ala Ala Ala Ala Leu Leu Pro Gly Ala Thr
                20                  25                  30

Ala Leu Gln Cys Phe Cys His Leu Cys Thr Lys Asp Asn Phe Thr Cys
            35                  40                  45

Val Thr Asp Gly Leu Cys Phe Val Ser Val Thr Glu Thr Thr Asp Lys
50                  55                  60

Val Ile His Asn Ser Met Cys Ile Ala Glu Ile Asp Leu Ile Pro Arg
65                  70                  75                  80

Asp Arg Pro Phe Val Cys Ala Pro Ser Ser Lys Thr Gly Ser Val Thr
                85                  90                  95

Thr Thr Tyr Cys Cys Asn Gln Asp His Cys Asn Lys Ile Glu Leu Pro
            100                 105                 110

Thr Thr Val Lys Ser Ser Pro Gly Leu Gly Pro Val Glu Leu Ala Ala
            115                 120                 125

Val Ile Ala Gly Pro Val Cys Phe Val Cys Ile Ser Leu Met Leu Met
130                 135                 140
```

Val Tyr Ile Cys His Asn Arg Thr Val Ile His Arg Val Pro Asn
145                 150                 155                 160

Glu Glu Asp Pro Ser Leu Asp Arg Pro Phe Ile Ser Glu Gly Thr Thr
            165                 170                 175

Leu Lys Asp Leu Ile Tyr Asp Met Thr Thr Ser Gly Gly Ser Gly
        180                 185                 190

Leu Pro Leu Leu Val Gln Arg Thr Ile Ala Arg Thr Ile Val Leu Gln
        195                 200                 205

Glu Ser Ile Gly Lys Gly Arg Phe Gly Glu Val Trp Arg Gly Lys Trp
210                 215                 220

Arg Gly Glu Glu Val Ala Val Lys Ile Phe Ser Ser Arg Glu Glu Arg
225                 230                 235                 240

Ser Trp Phe Arg Glu Ala Glu Ile Tyr Gln Thr Val Met Leu Arg His
            245                 250                 255

Glu Asn Ile Leu Gly Phe Ile Ala Ala Asp Asn Lys Asp Asn Gly Thr
        260                 265                 270

Trp Thr Gln Leu Trp Leu Val Ser Asp Tyr His Glu His Gly Ser Leu
        275                 280                 285

Phe Asp Tyr Leu Asn Arg Tyr Thr Val Thr Val Glu Gly Met Ile Lys
290                 295                 300

Leu Ala Leu Ser Thr Ala Ser Gly Leu Ala His Leu His Met Glu Ile
305                 310                 315                 320

Val Gly Thr Gln Gly Lys Pro Ala Ile Ala His Arg Asp Leu Lys Ser
            325                 330                 335

Lys Asn Ile Leu Val Lys Lys Asn Gly Thr Cys Cys Ile Ala Asp Leu
        340                 345                 350

Gly Leu Ala Val Arg His Asp Ser Ala Thr Asp Thr Ile Asp Ile Ala
        355                 360                 365

Pro Asn His Arg Val Gly Thr Lys Arg Tyr Met Ala Pro Glu Val Leu
370                 375                 380

Asp Asp Ser Ile Asn Met Lys His Phe Glu Ser Phe Lys Arg Ala Asp
385                 390                 395                 400

Ile Tyr Ala Met Gly Leu Val Phe Trp Glu Ile Ala Arg Arg Cys Ser
            405                 410                 415

Ile Gly Gly Ile His Glu Asp Tyr Gln Leu Pro Tyr Tyr Asp Leu Val
        420                 425                 430

Pro Ser Asp Pro Ser Val Glu Glu Met Arg Lys Val Val Cys Glu Gln
        435                 440                 445

Lys Leu Arg Pro Asn Ile Pro Asn Arg Trp Gln Ser Cys Glu Ala Leu
450                 455                 460

Arg Val Met Ala Lys Ile Met Arg Glu Cys Trp Tyr Ala Asn Gly Ala
465                 470                 475                 480

Ala Arg Leu Thr Ala Leu Arg Ile Lys Lys Thr Leu Ser Gln Leu Ser
            485                 490                 495

Gln Gln Glu Gly Ile Lys Met
            500

<210> SEQ ID NO 3
<211> LENGTH: 232
<212> TYPE: PRT
<213> ORGANISM: human

<400> SEQUENCE: 3

Met Asn Phe Leu Leu Ser Trp Val His Trp Ser Leu Ala Leu Leu Leu

-continued

```
1               5                   10                  15
Tyr Leu His His Ala Lys Trp Ser Gln Ala Ala Pro Met Ala Glu Gly
            20                  25                  30

Gly Gly Gln Asn His His Glu Val Val Lys Phe Met Asp Val Tyr Gln
            35                  40                  45

Arg Ser Tyr Cys His Pro Ile Glu Thr Leu Val Asp Ile Phe Gln Glu
    50                  55                  60

Tyr Pro Asp Glu Ile Glu Tyr Ile Phe Lys Pro Ser Cys Val Pro Leu
65                  70                  75                  80

Met Arg Cys Gly Gly Cys Cys Asn Asp Glu Gly Leu Glu Cys Val Pro
                85                  90                  95

Thr Glu Glu Ser Asn Ile Thr Met Gln Ile Met Arg Ile Lys Pro His
            100                 105                 110

Gln Gly Gln His Ile Gly Glu Met Ser Phe Leu Gln His Asn Lys Cys
            115                 120                 125

Glu Cys Arg Pro Lys Lys Asp Arg Ala Arg Gln Glu Lys Lys Ser Val
        130                 135                 140

Arg Gly Lys Gly Lys Gly Gln Lys Arg Lys Arg Lys Lys Ser Arg Tyr
145                 150                 155                 160

Lys Ser Trp Ser Val Tyr Val Gly Ala Arg Cys Cys Leu Met Pro Trp
                165                 170                 175

Ser Leu Pro Gly Pro His Pro Cys Gly Pro Cys Ser Glu Arg Arg Lys
            180                 185                 190

His Leu Phe Val Gln Asp Pro Gln Thr Cys Lys Cys Ser Cys Lys Asn
            195                 200                 205

Thr Asp Ser Arg Cys Lys Ala Arg Gln Leu Glu Leu Asn Glu Arg Thr
    210                 215                 220

Cys Arg Cys Asp Lys Pro Arg Arg
225                 230

<210> SEQ ID NO 4
<211> LENGTH: 728
<212> TYPE: PRT
<213> ORGANISM: human

<400> SEQUENCE: 4

Met Trp Val Thr Lys Leu Leu Pro Ala Leu Leu Leu Gln His Val Leu
1               5                   10                  15

Leu His Leu Leu Leu Leu Pro Ile Ala Ile Pro Tyr Ala Glu Gly Gln
            20                  25                  30

Arg Lys Arg Arg Asn Thr Ile His Glu Phe Lys Lys Ser Ala Lys Thr
            35                  40                  45

Thr Leu Ile Lys Ile Asp Pro Ala Leu Lys Ile Lys Thr Lys Lys Val
    50                  55                  60

Asn Thr Ala Asp Gln Cys Ala Asn Arg Cys Thr Arg Asn Lys Gly Leu
65                  70                  75                  80

Pro Phe Thr Cys Lys Ala Phe Val Phe Asp Lys Ala Arg Lys Gln Cys
                85                  90                  95

Leu Trp Phe Pro Phe Asn Ser Met Ser Ser Gly Val Lys Lys Glu Phe
            100                 105                 110

Gly His Glu Phe Asp Leu Tyr Glu Asn Lys Asp Tyr Ile Arg Asn Cys
            115                 120                 125

Ile Ile Gly Lys Gly Arg Ser Tyr Lys Gly Thr Val Ser Ile Thr Lys
        130                 135                 140
```

```
Ser Gly Ile Lys Cys Gln Pro Trp Ser Ser Met Ile Pro His Glu His
145                 150                 155                 160

Ser Phe Leu Pro Ser Ser Tyr Arg Gly Lys Asp Leu Gln Glu Asn Tyr
            165                 170                 175

Cys Arg Asn Pro Arg Gly Glu Glu Gly Gly Pro Trp Cys Phe Thr Ser
                180                 185                 190

Asn Pro Glu Val Arg Tyr Glu Val Cys Asp Ile Pro Gln Cys Ser Glu
            195                 200                 205

Val Glu Cys Met Thr Cys Asn Gly Glu Ser Tyr Arg Gly Leu Met Asp
        210                 215                 220

His Thr Glu Ser Gly Lys Ile Cys Gln Arg Trp Asp His Gln Thr Pro
225                 230                 235                 240

His Arg His Lys Phe Leu Pro Glu Arg Tyr Pro Asp Lys Gly Phe Asp
                245                 250                 255

Asp Asn Tyr Cys Arg Asn Pro Asp Gly Gln Pro Arg Pro Trp Cys Tyr
            260                 265                 270

Thr Leu Asp Pro His Thr Arg Trp Glu Tyr Cys Ala Ile Lys Thr Cys
        275                 280                 285

Ala Asp Asn Thr Met Asn Asp Thr Asp Val Pro Leu Glu Thr Thr Glu
290                 295                 300

Cys Ile Gln Gly Gln Gly Glu Gly Tyr Arg Gly Thr Val Asn Thr Ile
305                 310                 315                 320

Trp Asn Gly Ile Pro Cys Gln Arg Trp Asp Ser Gln Tyr Pro His Glu
                325                 330                 335

His Asp Met Thr Pro Glu Asn Phe Lys Cys Lys Asp Leu Arg Glu Asn
            340                 345                 350

Tyr Cys Arg Asn Pro Asp Gly Ser Glu Ser Pro Trp Cys Phe Thr Thr
        355                 360                 365

Asp Pro Asn Ile Arg Val Gly Tyr Cys Ser Gln Ile Pro Asn Cys Asp
        370                 375                 380

Met Ser His Gly Gln Asp Cys Tyr Arg Gly Asn Gly Lys Asn Tyr Met
385                 390                 395                 400

Gly Asn Leu Ser Gln Thr Arg Ser Gly Leu Thr Cys Ser Met Trp Asp
            405                 410                 415

Lys Asn Met Glu Asp Leu His Arg His Ile Phe Trp Glu Pro Asp Ala
        420                 425                 430

Ser Lys Leu Asn Glu Asn Tyr Cys Arg Asn Pro Asp Asp Asp Ala His
        435                 440                 445

Gly Pro Trp Cys Tyr Thr Gly Asn Pro Leu Ile Pro Trp Asp Tyr Cys
450                 455                 460

Pro Ile Ser Arg Cys Glu Gly Asp Thr Thr Pro Thr Ile Val Asn Leu
465                 470                 475                 480

Asp His Pro Val Ile Ser Cys Ala Lys Thr Lys Gln Leu Arg Val Val
            485                 490                 495

Asn Gly Ile Pro Thr Arg Thr Asn Ile Gly Trp Met Val Ser Leu Arg
            500                 505                 510

Tyr Arg Asn Lys His Ile Cys Gly Gly Ser Leu Ile Lys Glu Ser Trp
        515                 520                 525

Val Leu Thr Ala Arg Gln Cys Phe Pro Ser Arg Asp Leu Lys Asp Tyr
        530                 535                 540

Glu Ala Trp Leu Gly Ile His Asp Val His Gly Arg Gly Asp Glu Lys
545                 550                 555                 560

Cys Lys Gln Val Leu Asn Val Ser Gln Leu Val Tyr Gly Pro Glu Gly
```

565                 570                 575
Ser Asp Leu Val Leu Met Lys Leu Ala Arg Pro Ala Val Leu Asp Asp
                580                 585                 590

Phe Val Ser Thr Ile Asp Leu Pro Asn Tyr Gly Cys Thr Ile Pro Glu
            595                 600                 605

Lys Thr Ser Cys Ser Val Tyr Gly Trp Gly Tyr Thr Gly Leu Ile Asn
        610                 615                 620

Tyr Asp Gly Leu Leu Arg Val Ala His Leu Tyr Ile Met Gly Asn Glu
625                 630                 635                 640

Lys Cys Ser Gln His His Arg Gly Lys Val Thr Leu Asn Glu Ser Glu
                645                 650                 655

Ile Cys Ala Gly Ala Glu Lys Ile Gly Ser Gly Pro Cys Glu Gly Asp
                660                 665                 670

Tyr Gly Gly Pro Leu Val Cys Glu Gln His Lys Met Arg Met Val Leu
                675                 680                 685

Gly Val Ile Val Pro Gly Arg Gly Cys Ala Ile Pro Asn Arg Pro Gly
            690                 695                 700

Ile Phe Val Arg Val Ala Tyr Tyr Ala Lys Trp Ile His Lys Ile Ile
705                 710                 715                 720

Leu Thr Tyr Lys Val Pro Gln Ser
                725

<210> SEQ ID NO 5
<211> LENGTH: 574
<212> TYPE: PRT
<213> ORGANISM: human

<400> SEQUENCE: 5

Met Cys Pro Arg Ala Ala Arg Ala Pro Ala Thr Leu Leu Leu Ala Leu
1               5                   10                  15

Gly Ala Val Leu Trp Pro Ala Ala Gly Ala Trp Glu Leu Thr Ile Leu
                20                  25                  30

His Thr Asn Asp Val His Ser Arg Leu Glu Gln Thr Ser Glu Asp Ser
            35                  40                  45

Ser Lys Cys Val Asn Ala Ser Arg Cys Met Gly Gly Val Ala Arg Leu
        50                  55                  60

Phe Thr Lys Val Gln Gln Ile Arg Arg Ala Glu Pro Asn Val Leu Leu
65                  70                  75                  80

Leu Asp Ala Gly Asp Gln Tyr Gln Gly Thr Ile Trp Phe Thr Val Tyr
                85                  90                  95

Lys Gly Ala Glu Val Ala His Phe Met Asn Ala Leu Arg Tyr Asp Ala
                100                 105                 110

Met Ala Leu Gly Asn His Glu Phe Asp Asn Gly Val Glu Gly Leu Ile
            115                 120                 125

Glu Pro Leu Leu Lys Glu Ala Lys Phe Pro Ile Leu Ser Ala Asn Ile
        130                 135                 140

Lys Ala Lys Gly Pro Leu Ala Ser Gln Ile Ser Gly Leu Tyr Leu Pro
145                 150                 155                 160

Tyr Lys Val Leu Pro Val Gly Asp Glu Val Val Gly Ile Val Gly Tyr
                165                 170                 175

Thr Ser Lys Glu Thr Pro Phe Leu Ser Asn Pro Gly Thr Asn Leu Val
            180                 185                 190

Phe Glu Asp Glu Ile Thr Ala Leu Gln Pro Glu Val Asp Lys Leu Lys
        195                 200                 205

```
Thr Leu Asn Val Asn Lys Ile Ile Ala Leu Gly His Ser Gly Phe Glu
    210                 215                 220
Met Asp Lys Leu Ile Ala Gln Lys Val Arg Gly Val Asp Val Val
225                 230                 235                 240
Gly Gly His Ser Asn Thr Phe Leu Tyr Thr Gly Asn Pro Pro Ser Lys
                    245                 250                 255
Glu Val Pro Ala Gly Lys Tyr Pro Phe Ile Val Thr Ser Asp Asp Gly
                260                 265                 270
Arg Lys Val Pro Val Gln Ala Tyr Ala Phe Gly Lys Tyr Leu Gly
                275                 280                 285
Tyr Leu Lys Ile Glu Phe Asp Glu Arg Gly Asn Val Ile Ser Ser His
    290                 295                 300
Gly Asn Pro Ile Leu Leu Asn Ser Ser Ile Pro Glu Asp Pro Ser Ile
305                 310                 315                 320
Lys Ala Asp Ile Asn Lys Trp Arg Ile Lys Leu Asp Asn Tyr Ser Thr
                325                 330                 335
Gln Glu Leu Gly Lys Thr Ile Val Tyr Leu Asp Gly Ser Ser Gln Ser
                340                 345                 350
Cys Arg Phe Arg Glu Cys Asn Met Gly Asn Leu Ile Cys Asp Ala Met
    355                 360                 365
Ile Asn Asn Asn Leu Arg His Thr Asp Glu Met Phe Trp Asn His Val
370                 375                 380
Ser Met Cys Ile Leu Asn Gly Gly Gly Ile Arg Ser Pro Ile Asp Glu
385                 390                 395                 400
Arg Asn Asn Gly Thr Ile Thr Trp Glu Asn Leu Ala Ala Val Leu Pro
                405                 410                 415
Phe Gly Gly Thr Phe Asp Leu Val Gln Leu Lys Gly Ser Thr Leu Lys
                420                 425                 430
Lys Ala Phe Glu His Ser Val His Arg Tyr Gly Gln Ser Thr Gly Glu
    435                 440                 445
Phe Leu Gln Val Gly Gly Ile His Val Val Tyr Asp Leu Ser Arg Lys
    450                 455                 460
Pro Gly Asp Arg Val Val Lys Leu Asp Val Leu Cys Thr Lys Cys Arg
465                 470                 475                 480
Val Pro Ser Tyr Asp Pro Leu Lys Met Asp Glu Val Tyr Lys Val Ile
                485                 490                 495
Leu Pro Asn Phe Leu Ala Asn Gly Gly Asp Gly Phe Gln Met Ile Lys
                500                 505                 510
Asp Glu Leu Leu Arg His Asp Ser Gly Asp Gln Asp Ile Asn Val Val
    515                 520                 525
Ser Thr Tyr Ile Ser Lys Met Lys Val Ile Tyr Pro Ala Val Glu Gly
    530                 535                 540
Arg Ile Lys Phe Ser Thr Gly Ser His Cys His Gly Ser Phe Ser Leu
545                 550                 555                 560
Ile Phe Leu Ser Leu Trp Ala Val Ile Phe Val Leu Tyr Gln
                565                 570

<210> SEQ ID NO 6
<211> LENGTH: 161
<212> TYPE: PRT
<213> ORGANISM: human

<400> SEQUENCE: 6

Met Asn Leu Ala Ile Ser Ile Ala Leu Leu Leu Thr Val Leu Gln Val
1               5                   10                  15
```

```
Ser Arg Gly Gln Lys Val Thr Ser Leu Thr Ala Cys Leu Val Asp Gln
         20                  25                  30

Ser Leu Arg Leu Asp Cys Arg His Glu Asn Thr Ser Ser Ser Pro Ile
         35                  40                  45

Gln Tyr Glu Phe Ser Leu Thr Arg Glu Thr Lys Lys His Val Leu Phe
 50                  55                  60

Gly Thr Val Gly Val Pro Glu His Thr Tyr Arg Ser Arg Thr Asn Phe
 65                  70                  75                  80

Thr Ser Lys Tyr Asn Met Lys Val Leu Tyr Leu Ser Ala Phe Thr Ser
             85                  90                  95

Lys Asp Glu Gly Thr Tyr Thr Cys Ala Leu His His Ser Gly His Ser
                100                 105                 110

Pro Pro Ile Ser Ser Gln Asn Val Thr Val Leu Arg Asp Lys Leu Val
         115                 120                 125

Lys Cys Glu Gly Ile Ser Leu Leu Ala Gln Asn Thr Ser Trp Leu Leu
 130                 135                 140

Leu Leu Leu Leu Ser Leu Ser Leu Leu Gln Ala Thr Asp Phe Met Ser
145                 150                 155                 160

Leu

<210> SEQ ID NO 7
<211> LENGTH: 658
<212> TYPE: PRT
<213> ORGANISM: human

<400> SEQUENCE: 7

Met Asp Arg Gly Thr Leu Pro Leu Ala Val Ala Leu Leu Leu Ala Ser
 1               5                  10                  15

Cys Ser Leu Ser Pro Thr Ser Leu Ala Glu Thr Val His Cys Asp Leu
             20                  25                  30

Gln Pro Val Gly Pro Glu Arg Gly Glu Val Thr Tyr Thr Thr Ser Gln
         35                  40                  45

Val Ser Lys Gly Cys Val Ala Gln Ala Pro Asn Ala Ile Leu Glu Val
 50                  55                  60

His Val Leu Phe Leu Glu Phe Pro Thr Gly Pro Ser Gln Leu Glu Leu
 65                  70                  75                  80

Thr Leu Gln Ala Ser Lys Gln Asn Gly Thr Trp Pro Arg Glu Val Leu
             85                  90                  95

Leu Val Leu Ser Val Asn Ser Ser Val Phe Leu His Leu Gln Ala Leu
                100                 105                 110

Gly Ile Pro Leu His Leu Ala Tyr Asn Ser Ser Leu Val Thr Phe Gln
         115                 120                 125

Glu Pro Pro Gly Val Asn Thr Thr Glu Leu Pro Ser Phe Pro Lys Thr
 130                 135                 140

Gln Ile Leu Glu Trp Ala Ala Glu Arg Gly Pro Ile Thr Ser Ala Ala
145                 150                 155                 160

Glu Leu Asn Asp Pro Gln Ser Ile Leu Leu Arg Leu Gly Gln Ala Gln
                165                 170                 175

Gly Ser Leu Ser Phe Cys Met Leu Glu Ala Ser Gln Asp Met Gly Arg
         180                 185                 190

Thr Leu Glu Trp Arg Pro Arg Thr Pro Ala Leu Val Arg Gly Cys His
         195                 200                 205

Leu Glu Gly Val Ala Gly His Lys Glu Ala His Ile Leu Arg Val Leu
 210                 215                 220
```

```
Pro Gly His Ser Ala Gly Pro Arg Thr Val Thr Val Lys Val Glu Leu
225                 230                 235                 240

Ser Cys Ala Pro Gly Asp Leu Asp Ala Val Leu Ile Leu Gln Gly Pro
            245                 250                 255

Pro Tyr Val Ser Trp Leu Ile Asp Ala Asn His Asn Met Gln Ile Trp
        260                 265                 270

Thr Thr Gly Glu Tyr Ser Phe Lys Ile Phe Pro Glu Lys Asn Ile Arg
    275                 280                 285

Gly Phe Lys Leu Pro Asp Thr Pro Gln Gly Leu Leu Gly Glu Ala Arg
290                 295                 300

Met Leu Asn Ala Ser Ile Val Ala Ser Phe Val Glu Leu Pro Leu Ala
305                 310                 315                 320

Ser Ile Val Ser Leu His Ala Ser Ser Cys Gly Gly Arg Leu Gln Thr
            325                 330                 335

Ser Pro Ala Pro Ile Gln Thr Thr Pro Pro Lys Asp Thr Cys Ser Pro
            340                 345                 350

Glu Leu Leu Met Ser Leu Ile Gln Thr Lys Cys Ala Asp Asp Ala Met
            355                 360                 365

Thr Leu Val Leu Lys Lys Glu Leu Val Ala His Leu Lys Cys Thr Ile
370                 375                 380

Thr Gly Leu Thr Phe Trp Asp Pro Ser Cys Glu Ala Glu Asp Arg Gly
385                 390                 395                 400

Asp Lys Phe Val Leu Arg Ser Ala Tyr Ser Ser Cys Gly Met Gln Val
            405                 410                 415

Ser Ala Ser Met Ile Ser Asn Glu Ala Val Val Asn Ile Leu Ser Ser
            420                 425                 430

Ser Ser Pro Gln Arg Lys Lys Val His Cys Leu Asn Met Asp Ser Leu
            435                 440                 445

Ser Phe Gln Leu Gly Leu Tyr Leu Ser Pro His Phe Leu Gln Ala Ser
450                 455                 460

Asn Thr Ile Glu Pro Gly Gln Gln Ser Phe Val Gln Val Arg Val Ser
465                 470                 475                 480

Pro Ser Val Ser Glu Phe Leu Leu Gln Leu Asp Ser Cys His Leu Asp
            485                 490                 495

Leu Gly Pro Glu Gly Gly Thr Val Glu Leu Ile Gln Gly Arg Ala Ala
            500                 505                 510

Lys Gly Asn Cys Val Ser Leu Leu Ser Pro Ser Pro Glu Gly Asp Pro
            515                 520                 525

Arg Phe Ser Phe Leu Leu His Phe Tyr Thr Val Pro Ile Pro Lys Thr
            530                 535                 540

Gly Thr Leu Ser Cys Thr Val Ala Leu Arg Pro Lys Thr Gly Ser Gln
545                 550                 555                 560

Asp Gln Glu Val His Arg Thr Val Phe Met Arg Leu Asn Ile Ile Ser
            565                 570                 575

Pro Asp Leu Ser Gly Cys Thr Ser Lys Gly Leu Val Leu Pro Ala Val
            580                 585                 590

Leu Gly Ile Thr Phe Gly Ala Phe Leu Ile Gly Ala Leu Leu Thr Ala
            595                 600                 605

Ala Leu Trp Tyr Ile Tyr Ser His Thr Arg Ser Pro Ser Lys Arg Glu
            610                 615                 620

Pro Val Val Ala Val Ala Ala Pro Ala Ser Ser Glu Ser Ser Ser Thr
625                 630                 635                 640
```

```
Asn His Ser Ile Gly Ser Thr Gln Ser Thr Pro Cys Ser Thr Ser Ser
                645                 650                 655

Met Ala
```

<210> SEQ ID NO 8
<211> LENGTH: 385
<212> TYPE: PRT
<213> ORGANISM: human

<400> SEQUENCE: 8

```
Met Leu Val Arg Arg Gly Ala Arg Ala Gly Pro Arg Met Pro Arg Gly
1               5                   10                  15

Trp Thr Ala Leu Cys Leu Leu Ser Leu Leu Pro Ser Gly Phe Met Ser
                20                  25                  30

Leu Asp Asn Asn Gly Thr Ala Thr Pro Glu Leu Pro Thr Gln Gly Thr
            35                  40                  45

Phe Ser Asn Val Ser Thr Asn Val Ser Tyr Gln Glu Thr Thr Thr Pro
        50                  55                  60

Ser Thr Leu Gly Ser Thr Ser Leu His Pro Val Ser Gln His Gly Asn
65                  70                  75                  80

Glu Ala Thr Thr Asn Ile Thr Glu Thr Thr Val Lys Phe Thr Ser Thr
                85                  90                  95

Ser Val Ile Thr Ser Val Tyr Gly Asn Thr Asn Ser Ser Val Gln Ser
            100                 105                 110

Gln Thr Ser Val Ile Ser Thr Val Phe Thr Thr Pro Ala Asn Val Ser
        115                 120                 125

Thr Pro Glu Thr Thr Leu Lys Pro Ser Leu Ser Pro Gly Asn Val Ser
130                 135                 140

Asp Leu Ser Thr Thr Ser Thr Ser Leu Ala Thr Ser Pro Thr Lys Pro
145                 150                 155                 160

Tyr Thr Ser Ser Ser Pro Ile Leu Ser Asp Ile Lys Ala Glu Ile Lys
                165                 170                 175

Cys Ser Gly Ile Arg Glu Val Lys Leu Thr Gln Gly Ile Cys Leu Glu
            180                 185                 190

Gln Asn Lys Thr Ser Ser Cys Ala Glu Phe Lys Lys Asp Arg Gly Glu
        195                 200                 205

Gly Leu Ala Arg Val Leu Cys Gly Glu Glu Gln Ala Asp Ala Asp Ala
210                 215                 220

Gly Ala Gln Val Cys Ser Leu Leu Leu Ala Gln Ser Glu Val Arg Pro
225                 230                 235                 240

Gln Cys Leu Leu Leu Val Leu Ala Asn Arg Thr Glu Ile Ser Ser Lys
                245                 250                 255

Leu Gln Leu Met Lys Lys His Gln Ser Asp Leu Lys Lys Leu Gly Ile
            260                 265                 270

Leu Asp Phe Thr Glu Gln Asp Val Ala Ser His Gln Ser Tyr Ser Gln
        275                 280                 285

Lys Thr Leu Ile Ala Leu Val Thr Ser Gly Ala Leu Leu Ala Val Leu
290                 295                 300

Gly Ile Thr Gly Tyr Phe Leu Met Asn Arg Arg Ser Trp Ser Pro Thr
305                 310                 315                 320

Gly Glu Arg Leu Gly Glu Asp Pro Tyr Tyr Thr Glu Asn Gly Gly Gly
                325                 330                 335

Gln Gly Tyr Ser Ser Gly Pro Gly Thr Ser Pro Glu Ala Gln Gly Lys
            340                 345                 350
```

```
Ala Ser Val Asn Arg Gly Ala Gln Glu Asn Gly Thr Gly Gln Ala Thr
            355                 360                 365

Ser Arg Asn Gly His Ser Ala Arg Gln His Val Val Ala Asp Thr Glu
    370                 375                 380

Leu
385

<210> SEQ ID NO 9
<211> LENGTH: 1304
<212> TYPE: PRT
<213> ORGANISM: human

<400> SEQUENCE: 9

Met Tyr Leu Trp Leu Lys Leu Leu Ala Phe Gly Phe Ala Phe Leu Asp
1               5                   10                  15

Thr Glu Val Phe Val Thr Gly Gln Ser Pro Thr Pro Ser Pro Thr Gly
            20                  25                  30

Leu Thr Thr Ala Lys Met Pro Ser Val Pro Leu Ser Ser Asp Pro Leu
        35                  40                  45

Pro Thr His Thr Thr Ala Phe Ser Pro Ala Ser Thr Phe Glu Arg Glu
    50                  55                  60

Asn Asp Phe Ser Glu Thr Thr Thr Ser Leu Ser Pro Asp Asn Thr Ser
65                  70                  75                  80

Thr Gln Val Ser Pro Asp Ser Leu Asp Asn Ala Ser Ala Phe Asn Thr
            85                  90                  95

Thr Gly Val Ser Ser Val Gln Thr Pro His Leu Pro Thr His Ala Asp
            100                 105                 110

Ser Gln Thr Pro Ser Ala Gly Thr Asp Thr Gln Thr Phe Ser Gly Ser
        115                 120                 125

Ala Ala Asn Ala Lys Leu Asn Pro Thr Pro Gly Ser Asn Ala Ile Ser
    130                 135                 140

Asp Val Pro Gly Glu Arg Ser Thr Ala Ser Thr Phe Pro Thr Asp Pro
145                 150                 155                 160

Val Ser Pro Leu Thr Thr Thr Leu Ser Leu Ala His His Ser Ser Ala
            165                 170                 175

Ala Leu Pro Ala Arg Thr Ser Asn Thr Thr Ile Thr Ala Asn Thr Ser
        180                 185                 190

Asp Ala Tyr Leu Asn Ala Ser Glu Thr Thr Thr Leu Ser Pro Ser Gly
    195                 200                 205

Ser Ala Val Ile Ser Thr Thr Ile Ala Thr Thr Pro Ser Lys Pro
210                 215                 220

Thr Cys Asp Glu Lys Tyr Ala Asn Ile Thr Val Asp Tyr Leu Tyr Asn
225                 230                 235                 240

Lys Glu Thr Lys Leu Phe Thr Ala Lys Leu Asn Val Asn Glu Asn Val
            245                 250                 255

Glu Cys Gly Asn Asn Thr Cys Thr Asn Asn Glu Val His Asn Leu Thr
        260                 265                 270

Glu Cys Lys Asn Ala Ser Val Ser Ile Ser His Asn Ser Cys Thr Ala
    275                 280                 285

Pro Asp Lys Thr Leu Ile Leu Asp Val Pro Pro Gly Val Glu Lys Phe
    290                 295                 300

Gln Leu His Asp Cys Thr Gln Val Glu Lys Ala Asp Thr Thr Ile Cys
305                 310                 315                 320

Leu Lys Trp Lys Asn Ile Glu Thr Phe Thr Cys Asp Thr Gln Asn Ile
            325                 330                 335
```

```
Thr Tyr Arg Phe Gln Cys Gly Asn Met Ile Phe Asp Asn Lys Glu Ile
            340                 345                 350

Lys Leu Glu Asn Leu Glu Pro Glu His Glu Tyr Lys Cys Asp Ser Glu
            355                 360                 365

Ile Leu Tyr Asn Asn His Lys Phe Thr Asn Ala Ser Lys Ile Ile Lys
            370                 375                 380

Thr Asp Phe Gly Ser Pro Gly Glu Pro Gln Ile Ile Phe Cys Arg Ser
385                 390                 395                 400

Glu Ala Ala His Gln Gly Val Ile Thr Trp Asn Pro Pro Gln Arg Ser
                405                 410                 415

Phe His Asn Phe Thr Leu Cys Tyr Ile Lys Thr Glu Lys Asp Cys
            420                 425                 430

Leu Asn Leu Asp Lys Asn Leu Ile Lys Tyr Asp Leu Gln Asn Leu Lys
            435                 440                 445

Pro Tyr Thr Lys Tyr Val Leu Ser Leu His Ala Tyr Ile Ile Ala Lys
    450                 455                 460

Val Gln Arg Asn Gly Ser Ala Ala Met Cys His Phe Thr Thr Lys Ser
465                 470                 475                 480

Ala Pro Pro Ser Gln Val Trp Asn Met Thr Val Ser Met Thr Ser Asp
                485                 490                 495

Asn Ser Met His Val Lys Cys Arg Pro Pro Arg Asp Arg Asn Gly Pro
            500                 505                 510

His Glu Arg Tyr His Leu Glu Val Glu Ala Gly Asn Thr Leu Val Arg
            515                 520                 525

Asn Glu Ser His Lys Asn Cys Asp Phe Arg Val Lys Asp Leu Gln Tyr
            530                 535                 540

Ser Thr Asp Tyr Thr Phe Lys Ala Tyr Phe His Asn Gly Asp Tyr Pro
545                 550                 555                 560

Gly Glu Pro Phe Ile Leu His His Ser Thr Ser Tyr Asn Ser Lys Ala
                565                 570                 575

Leu Ile Ala Phe Leu Ala Phe Leu Ile Ile Val Thr Ser Ile Ala Leu
            580                 585                 590

Leu Val Val Leu Tyr Lys Ile Tyr Asp Leu His Lys Lys Arg Ser Cys
            595                 600                 605

Asn Leu Asp Glu Gln Gln Glu Leu Val Glu Arg Asp Asp Glu Lys Gln
            610                 615                 620

Leu Met Asn Val Glu Pro Ile His Ala Asp Ile Leu Leu Glu Thr Tyr
625                 630                 635                 640

Lys Arg Lys Ile Ala Asp Glu Gly Arg Leu Phe Leu Ala Glu Phe Gln
                645                 650                 655

Ser Ile Pro Arg Val Phe Ser Lys Phe Pro Ile Lys Glu Ala Arg Lys
            660                 665                 670

Pro Phe Asn Gln Asn Lys Asn Arg Tyr Val Asp Ile Leu Pro Tyr Asp
            675                 680                 685

Tyr Asn Arg Val Glu Leu Ser Glu Ile Asn Gly Asp Ala Gly Ser Asn
            690                 695                 700

Tyr Ile Asn Ala Ser Tyr Ile Asp Gly Phe Lys Glu Pro Arg Lys Tyr
705                 710                 715                 720

Ile Ala Ala Gln Gly Pro Arg Asp Glu Thr Val Asp Asp Phe Trp Arg
                725                 730                 735

Met Ile Trp Glu Gln Lys Ala Thr Val Ile Val Met Val Thr Arg Cys
            740                 745                 750
```

```
Glu Glu Gly Asn Arg Asn Lys Cys Ala Glu Tyr Trp Pro Ser Met Glu
            755                 760                 765
Glu Gly Thr Arg Ala Phe Gly Asp Val Val Lys Ile Asn Gln His
    770                 775                 780
Lys Arg Cys Pro Asp Tyr Ile Ile Gln Lys Leu Asn Ile Val Asn Lys
785                 790                 795                 800
Lys Glu Lys Ala Thr Gly Arg Glu Val Thr His Ile Gln Phe Thr Ser
                805                 810                 815
Trp Pro Asp His Gly Val Pro Glu Asp Pro His Leu Leu Leu Lys Leu
            820                 825                 830
Arg Arg Arg Val Asn Ala Phe Ser Asn Phe Ser Gly Pro Ile Val
            835                 840                 845
Val His Cys Ser Ala Gly Val Gly Arg Thr Gly Thr Tyr Ile Gly Ile
    850                 855                 860
Asp Ala Met Leu Glu Gly Leu Glu Ala Glu Asn Lys Val Asp Val Tyr
865                 870                 875                 880
Gly Tyr Val Val Lys Leu Arg Arg Gln Arg Cys Leu Met Val Gln Val
                885                 890                 895
Glu Ala Gln Tyr Ile Leu Ile His Gln Ala Leu Val Glu Tyr Asn Gln
            900                 905                 910
Phe Gly Glu Thr Glu Val Asn Leu Ser Glu Leu His Pro Tyr Leu His
    915                 920                 925
Asn Met Lys Lys Arg Asp Pro Pro Ser Glu Pro Ser Pro Leu Glu Ala
930                 935                 940
Glu Phe Gln Arg Leu Pro Ser Tyr Arg Ser Trp Arg Thr Gln His Ile
945                 950                 955                 960
Gly Asn Gln Glu Glu Asn Lys Ser Lys Asn Arg Asn Ser Asn Val Ile
                965                 970                 975
Pro Tyr Asp Tyr Asn Arg Val Pro Leu Lys His Glu Leu Glu Met Ser
            980                 985                 990
Lys Glu Ser Glu His Asp Ser Asp  Glu Ser Ser Asp  Asp Ser Asp
                995                 1000                1005
Ser Glu  Glu Pro Ser Lys Tyr  Ile Asn Ala Ser Phe  Ile Met Ser
    1010                1015                1020
Tyr Trp  Lys Pro Glu Val Met  Ile Ala Ala Gln Gly  Pro Leu Lys
    1025                1030                1035
Glu Thr  Ile Gly Asp Phe Trp  Gln Met Ile Phe Gln  Arg Lys Val
    1040                1045                1050
Lys Val  Ile Val Met Leu Thr  Glu Leu Lys His Gly  Asp Gln Glu
    1055                1060                1065
Ile Cys  Ala Gln Tyr Trp Gly  Glu Gly Lys Gln Thr  Tyr Gly Asp
    1070                1075                1080
Ile Glu  Val Asp Leu Lys Asp  Thr Asp Lys Ser Ser  Thr Tyr Thr
    1085                1090                1095
Leu Arg  Val Phe Glu Leu Arg  His Ser Lys Arg Lys  Asp Ser Arg
    1100                1105                1110
Thr Val  Tyr Gln Tyr Gln Tyr  Thr Asn Trp Ser Val  Glu Gln Leu
    1115                1120                1125
Pro Ala  Glu Pro Lys Glu Leu  Ile Ser Met Ile Gln  Val Val Lys
    1130                1135                1140
Gln Lys  Leu Pro Gln Lys Asn  Ser Ser Glu Gly Asn  Lys His His
    1145                1150                1155
Lys Ser  Thr Pro Leu Leu Ile  His Cys Arg Asp Gly  Ser Gln Gln
```

```
                1160                1165                1170

Thr Gly Ile Phe Cys Ala Leu Leu Asn Leu Leu Glu Ser Ala Glu
    1175                1180                1185

Thr Glu Glu Val Val Asp Ile Phe Gln Val Val Lys Ala Leu Arg
    1190                1195                1200

Lys Ala Arg Pro Gly Met Val Ser Thr Phe Glu Gln Tyr Gln Phe
    1205                1210                1215

Leu Tyr Asp Val Ile Ala Ser Thr Tyr Pro Ala Gln Asn Gly Gln
    1220                1225                1230

Val Lys Lys Asn Asn His Gln Glu Asp Lys Ile Glu Phe Asp Asn
    1235                1240                1245

Glu Val Asp Lys Val Lys Gln Asp Ala Asn Cys Val Asn Pro Leu
    1250                1255                1260

Gly Ala Pro Glu Lys Leu Pro Glu Ala Lys Glu Gln Ala Glu Gly
    1265                1270                1275

Ser Glu Pro Thr Ser Gly Thr Glu Gly Pro Glu His Ser Val Asn
    1280                1285                1290

Gly Pro Ala Ser Pro Ala Leu Asn Gln Gly Ser
    1295                1300

<210> SEQ ID NO 10
<211> LENGTH: 254
<212> TYPE: PRT
<213> ORGANISM: human

<400> SEQUENCE: 10

Met Ala Ile Ser Gly Val Pro Val Leu Gly Phe Phe Ile Ile Ala Val
1               5                   10                  15

Leu Met Ser Ala Gln Glu Ser Trp Ala Ile Lys Glu Glu His Val Ile
            20                  25                  30

Ile Gln Ala Glu Phe Tyr Leu Asn Pro Asp Gln Ser Gly Glu Phe Met
        35                  40                  45

Phe Asp Phe Asp Gly Asp Glu Ile Phe His Val Asp Met Ala Lys Lys
    50                  55                  60

Glu Thr Val Trp Arg Leu Glu Glu Phe Gly Arg Phe Ala Ser Phe Glu
65                  70                  75                  80

Ala Gln Gly Ala Leu Ala Asn Ile Ala Val Asp Lys Ala Asn Leu Glu
                85                  90                  95

Ile Met Thr Lys Arg Ser Asn Tyr Thr Pro Ile Thr Asn Val Pro Pro
            100                 105                 110

Glu Val Thr Val Leu Thr Asn Ser Pro Val Glu Leu Arg Glu Pro Asn
        115                 120                 125

Val Leu Ile Cys Phe Ile Asp Lys Phe Thr Pro Pro Val Val Asn Val
    130                 135                 140

Thr Trp Leu Arg Asn Gly Lys Pro Val Thr Gly Val Ser Glu Thr
145                 150                 155                 160

Val Phe Leu Pro Arg Glu Asp His Leu Phe Arg Lys Phe His Tyr Leu
                165                 170                 175

Pro Phe Leu Pro Ser Thr Glu Asp Val Tyr Asp Cys Arg Val Glu His
            180                 185                 190

Trp Gly Leu Asp Glu Pro Leu Leu Lys His Trp Glu Phe Asp Ala Pro
        195                 200                 205

Ser Pro Leu Pro Glu Thr Thr Glu Asn Val Val Cys Ala Leu Gly Leu
    210                 215                 220
```

```
-continued

Thr Val Gly Leu Val Gly Ile Ile Ile Gly Thr Ile Phe Ile Ile Lys
225                 230                 235                 240

Gly Val Arg Lys Ser Asn Ala Ala Glu Arg Arg Gly Pro Leu
                245                 250
```